(12) United States Patent
Wittek et al.

(10) Patent No.: US 7,455,894 B2
(45) Date of Patent: Nov. 25, 2008

(54) LIQUID-CRYSTALLINE MEDIUM

(75) Inventors: Michael Wittek, Darmstadt (DE); Elvira Montenegro, Weinheim (DE)

(73) Assignee: Merck Patent GmbH, Darmstadt (DE)

( * ) Notice: Subject to any disclaimer, the term of this patent is extended or adjusted under 35 U.S.C. 154(b) by 72 days.

(21) Appl. No.: 11/361,056

(22) Filed: Feb. 24, 2006

(65) Prior Publication Data

US 2006/0204677 A1 Sep. 14, 2006

(30) Foreign Application Priority Data

Feb. 25, 2005 (DE) .................. 10 2005 008 683

(51) Int. Cl.
*C09K 19/12* (2006.01)
*C09K 19/30* (2006.01)

(52) U.S. Cl. ............. 428/1.1; 252/299.66; 252/299.63

(58) Field of Classification Search .................. 428/1.1; 252/299.66, 299.63

See application file for complete search history.

(56) References Cited

U.S. PATENT DOCUMENTS

| | | | | |
|---|---|---|---|---|
| 5,874,022 A | * | 2/1999 | Kubo et al. | 252/299.01 |
| 6,200,654 B1 | * | 3/2001 | Poetsch et al. | 428/1.1 |
| 6,326,066 B1 | * | 12/2001 | Poetsch et al. | 428/1.1 |
| 6,344,247 B1 | * | 2/2002 | Kondou et al. | 428/1.1 |
| 7,108,895 B2 | * | 9/2006 | Yokokouji et al. | 428/1.1 |

* cited by examiner

*Primary Examiner*—Shean C Wu
(74) *Attorney, Agent, or Firm*—Millen, White, Zelano, Branigan, P.C.

(57) ABSTRACT

A liquid-crystalline medium based on a mixture of polar compounds, containing one or more compounds of the formula I

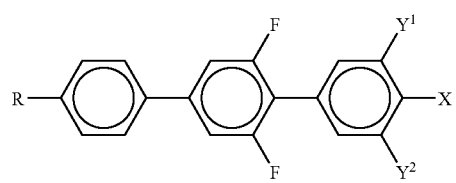

in which R, $Y^1$, $Y^2$ and X have the meanings indicated in Claim 1.

19 Claims, No Drawings

LIQUID-CRYSTALLINE MEDIUM

The present invention relates to a liquid-crystalline medium, and to the use thereof for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy $\Delta\epsilon$ and low electrical conductivity.

For example, for matrix liquid-crystal displays with integrated non-linear elements for switching individual pixels (MLC displays), media having large positive dielectric anisotropy ($\Delta\epsilon$), broad nematic phases, relatively low birefringence ($\Delta n$), very high specific resistance, good UV and temperature stability and relatively low vapor pressure are desired.

Furthermore, LCOS displays and displays based on a birefringence effect, such as OCB displays, are also interesting.

LCOS or LcoS™ (liquid crystal on silicon) displays are known from the prior art and are available from Three-Five Systems Inc. (Tempe, Ariz., USA). LCOS microdisplays are reflective displays which typically contain a liquid-crystal layer having a twisted nematic structure between a silicon backplane and a cover glass. The silicon backplane is an array of pixels, each of which has a mirrored surface which at the same time acts as electrical conductor. Each pixel comprises a stationary mirror covered by an active liquid-crystal layer having a twisted nematic alignment which can be switched into homeotropic alignment by application of a voltage. LCOS microdisplays are small, with a diagonal of typically less than 1.0", but enable high resolutions from ¼ VGA (78 thousand pixels) to UXGA+ (over 2 million pixels).

Owing to the small panel size, a very small cell thickness, typically about 1-3 microns, can also be achieved in LCOS displays. Small cell thicknesses are preferably used, in particular, for applications which require a short response time since the response time drops proportionally with the cell thickness. The liquid-crystalline phases used in such displays therefore have to have, in particular, high values for the optical anisotropy $\Delta n$, in contrast to conventional reflective-type LC displays, which usually require LC phases of low $\Delta n$.

OCB (optically compensated bend) displays are based on a birefringence effect and contain a liquid-crystal layer having a so-called "bend" structure. The "bend" cell, also known as "pi" cell, was first proposed by P. Bos et al., SID 83 Digest, 30 (1983) for an electrically controllable λ/2 plate, whereas the OCB mode for displays was described by Y. Yamaguchi, T. Miyashita and T. Uchida, SID 93 Digest, 277 (1993), and then in papers by T. Miyashita et al. in, inter alia, Proc. Eurodisplay, 149 (1993), J. Appl. Phys. 34, L177 (1995), SID 95 Digest, 797 (1995), C.-L. Kuo et al., SID 94 Digest, 927 (1994) and M. Suzuki, SID 96 Digest, 618 (1996). An OCB cell contains a liquid-crystal cell having a "bend" alignment and a liquid-crystal medium of positive $\Delta\epsilon$. In addition, the OCB displays disclosed in the above-mentioned documents contain one or more birefringent optical retardation films for preventing undesired light transmission by the "bend" cell in the dark state. OCB displays have a number of advantages over conventional displays based on twisted nematic (TN) cells, such as, for example, a wider viewing angle and shorter response times.

The above-mentioned documents have shown that liquid-crystalline phases preferably have high values for the optical anisotropy $\Delta n$ and a relatively high positive value for the dielectric anisotropy $\Delta\epsilon$ and preferably quite low values for the ratio between the elastic constants $K_{33}/K_{11}$ and for the viscosity in order to be usable for high-information display elements based on the OCB effect. The industrial application of the OCB effect in electro-optical displays requires LC phases which have to satisfy a multiplicity of requirements. Particularly important here are chemical resistance to moisture, air and physical effects, such as heat, radiation in the infrared, visible and ultraviolet regions and direct and alternating electrical fields. Furthermore, LC phases which can be used industrially are required to have a liquid-crystalline mesophase in a suitable temperature range, relatively high birefringence, positive dielectric anisotropy and low viscosity.

LCOS displays and OCB displays can be operated as matrix displays. Matrix liquid-crystal displays (MLC displays or "active matrix driven" or "AMD" displays) are known. Examples of non-linear elements which can be used to individually switch the individual pixels are active elements (i.e. transistors). The term "active matrix" is then used, where a distinction can be made between two types:

1. MOS (metal oxide semiconductor) or other diodes on silicon wafers as substrate,
2. Thin-film transistors (TFTs) on a glass plate as substrate.

In the case of type 1, the electro-optical effect used is usually dynamic scattering or the guest/host effect.

The use of single-crystal silicon as substrate material restricts the display size, since even modular assembly of various part-displays results in problems at the joints.

In the case of the more promising type 2, which is preferred, the electrooptical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The TFT displays usually operate as TN cells with crossed polarizers in transmission and are backlit.

The term MLC displays here encompasses any matrix display with integrated non-linear elements, i.e., besides the active matrix, also displays with passive elements, such as varistors or diodes (MIM=metal-insulatormetal).

MLC displays of this type are particularly suitable for TV applications or for high-information displays for computer applications (laptops) and in automobile or aircraft construction. Besides problems regarding the angle dependence of the contrast and the response times, difficulties also arise in MLC displays due to an insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallization and/or smectic phases occur, even at low temperatures, and the temperature dependence of the viscosity is as low as possible. The MLC displays from the prior art thus do not satisfy today's requirements.

Liquid-crystal displays for use in projection systems are subjected to particularly intense light radiation and therefore require liquid-crystalline media having particularly high light stability. However, it was hitherto not possible or not possible to a satisfactory extent to achieve liquid-crystalline media which at the same time have very high light stability, high $\Delta n$ values and sufficiently high $\Delta\epsilon$ values.

In TN (Schadt-Helfrich) cells, media are desired which facilitate the following advantages in the cells:
    extended nematic phase range (in particular down to low temperatures)
    storage-stable, even at extremely low temperatures
    the ability to switch at extremely low temperatures (outdoor use, automobiles, avionics)
    increased resistance to UV radiation (longer life)
    higher optical anisotropies for shorter response times owing to smaller cell thicknesses (d·$\Delta n$)

The media available from the prior art do not enable these advantages to be achieved while simultaneously retaining the other parameters.

In the case of supertwisted cells (STN), media are desired which facilitate greater multiplexability and/or a lower threshold voltage and/or broader nematic phase ranges (in particular at low temperatures). To this end, a further widening of the available parameter latitude (clearing point, smectic-nematic transition or melting point, viscosity, dielectric parameters, elastic parameters) is urgently desired.

There is thus still a great demand for liquid-crystalline media for MLC, LCOS, OCB, IPS, TN or STN displays, and displays for projection systems, which have very high light stability, in particular in the blue spectral region (from 420 nm), high UV stability, high $\Delta n$ values, relatively high $\Delta\epsilon$ values, low thresholds and broad liquid-crystal phases having high clearing points, in particular $\geq 70°$ C.

The invention includes providing liquid-crystalline media, in particular for MLC, LCOS, OCB, IPS, TN or STN displays of this type, and displays for projection systems, which do not exhibit the above-mentioned disadvantages or only do so to a lesser extent, and at the same time have relatively high clearing points, low thresholds and high values for the optical anisotropy $\Delta n$. The media should furthermore be distinguished by particularly high light stability, in particular in the wavelength range 420-700 nm, particularly preferably 400-700 nm, and high UV stability.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

It has now been found that these objects can be achieved if media according to the invention are used in displays. The media according to the invention are distinguished by high birefringence $\Delta n$, relatively high dielectric anisotropy $\Delta\epsilon$, very high light stability and a high clearing point. At the same time, they have a low threshold voltage and relatively low rotational viscosity $\gamma_1$.

The invention relates to a liquid-crystalline medium, characterised in that it comprises one or more compounds of the formula I

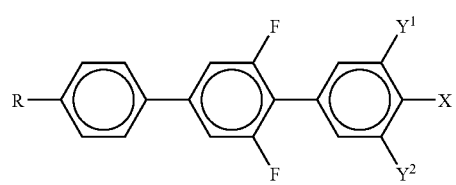

in which
R denotes a halogenated or unsubstituted alkyl or alkoxy radical having 1 to 15 C atoms, where one or more CH$_2$ groups in these radicals may also each, independently of one another, be replaced by —C≡C—, —CF$_2$O—, —CH=CH—,

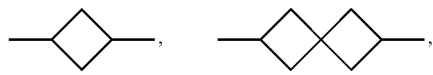

—O—, —CO—O— or —O—CO— in such a way that O atoms are not linked directly to one another,
X denotes F, Cl, CN, SF$_5$, SCN, NCS, a halogenated alkyl radical, a halogenated alkenyl radical, a halogenated alkoxy radical or a halogenated alkenyloxy radical having up to 6 C atoms, and
$Y^{1,2}$ each, independently of one another, denote H or F.

Surprisingly, it has been found that liquid-crystalline mixtures comprising compounds of the formula I have high light stabilities, especially in the blue spectral region, in particular in the wavelength range 420-700 nm, particularly preferably 400-700 nm, at the same time as high Δn values and relatively high Δε values.

The liquid-crystalline mixtures according to the invention having high light stability satisfy, in particular, the following criteria:

high "voltage holding ratio" (HR) after exposure to light,
stable electro-optical curve after exposure to light,
low optical discoloration (yellowing),
little precipitation of light-opaque polymerization products.

The compounds of the formula I have a broad range of applications. Depending on the choice of substituents, they can serve as base materials of which liquid-crystalline media are predominantly composed; however, it is also possible to add liquid-crystalline base materials from other classes of compound to the compounds of the formula I in order, for example, to influence the dielectric and/or optical anisotropy of a dielectric of this type and/or in order to optimize its threshold voltage and/or its viscosity.

The compounds of the formula I can be prepared, for example, by the processes described in EP 0 462 237.

In the pure state, the compounds of the formula I are colorless and form liquid-crystalline mesophases in a temperature range which is favorably located for electro-optical use. They are stable chemically, thermally and to light.

If R denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6-, or 7-oxaoctyl, 2-, 3-, 4-, 5-, 6-, 7- or 8-oxanonyl, 2-, 3-, 4-, 5-, 6-, 7-, 8- or 9-oxadecyl.

If R denotes an alkyl radical in which one $CH_2$ group has been replaced by —CH=CH—, this may be straight-chain or branched. It is preferably straight-chain and has 2 to 10 C atoms. Accordingly, it denotes in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-1-, -2-, -3-, -4-, -5-, -6-, -7- or -8-enyl, dec-1-, -2-, -3-, -4-, -5-, -6-, -7-, -8- or -9-enyl.

If R denotes an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 C atoms. Accordingly, they denote in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)-propyl, 3-(ethoxycarbonyl)propyl or 4-(methoxycarbonyl)butyl.

If R denotes an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has 4 to 12 C atoms. Accordingly, it denotes in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl, 9-methacryloyloxynonyl.

If R denotes an alkyl or alkenyl radical which is monosubstituted by CN or $CF_3$, this radical is preferably straight-chain. The substitution by CN or $CF_3$ is in any desired position.

If R denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups R may occasionally be of importance owing to better solubility in the conventional liquid-crystalline base materials, but in particular as chiral dopants if they are optically active. Smectic compounds of this type are suitable as components of ferroelectric materials.

Branched groups of this type generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy, 1-methylheptyloxy.

If R represents an alkyl radical in which two or more $CH_2$ groups have been replaced by —O— and/or —CO—O—, this may be straight-chain or branched. It is preferably branched and has 3 to 12 C atoms. Accordingly, it denotes in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl, 5,5-bis(ethoxycarbonyl)hexyl.

X in the compounds of the formula I preferably denotes F, Cl, CN, NCS, $CF_3$, $C_2F_5$, $C_3F_7$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCFHCFHCF_3$, $OCH_2CF_2CF_3$, $OCF_2CF_2CF_3$, $OCF_2CFHCFH_2$, $OCF_2CH_2CF_2H$, $OCFHCF_2CFH_2$, $OCFHCFHCF_2H$, $OCFHCH_2CF_3$, $OCH_2CFHCF_3$, $OCH_2CF_2CF_2H$, $OCF_2CFHCH_3$, $OCF_2CH_2CFH_2$, $OCHCF_2CH_3$, $OCFHCF-HCFH_2$, $OCHCH_2CF_3$, $OCH_2CF_2CFH_2$, $OCH_2CFHCF_2H$, $OCF_2CH_2CH_3$, $OCFHCFHCH_3$, $OCHCH_2CFH_2$, $OCH_2CF_2CH_3$, $OCH_2CFHCFH_2$, $OCH_2CH_2CF_2H$, $OCHCH_2CH_3$, $OCH_2CFHCH_3$, $OCH_2CH_2CF_2H$, $OCClFCF_3$, $OCClFCClF_2$, $OCClFCFH_2$, $OCFHCCl_2F$, $OCClFCF_2H$, $OCClFCClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CF_2H$, $OCClFCF_2CClF_2$, $OCClFCFHCF_3$, $OCClFCClFCF_3$, $OCCl_2CF_2CF_3$, $OCClHCF_2CF_3$, $OCClFCF_2CF_3$, $OCClFCClFCF_3$, $OCF_2CClFCFH_2$, $OCF_2CF_2CCl_2F$, $OCF_2CCl_2CF_2H$, $OCF_2CH_2CClF_2$, $OCClFCF_2CFH_2$, $OCFHCF_2CCl_2F$, $OCClFCFHCF_2H$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCFH_2$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCH_3$, $OCF_2CClFCCl_2H$, $OCClFCH_2CFH_2$, $OCFHCCl_2CFH_2$, $OCCl_2CF_2CH_3$, $OCH_2CF_2CClH_2$, $OCCl_2CFHCFH_2$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, $CH=CF_2$, $CF=CF_2$, $OCH=CF_2$, $OCF=CF_2$, $CH=CHF$, $OCH=CHF$, $CF=CHF$, $OCF=CHF$, in particular F, Cl, CN, NCS, $CF_3$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCF_2CF_2CF_3$ or $OCF_2CHFCF_3$.

Particular preference is given to compounds of the formula I in which X denotes F, Cl or mono- or polyfluorinated alkyl or alkoxy having 1, 2 or 3 C atoms or mono- or polyfluorinated alkenyl having 2 or 3 C atoms, in particular one of the above-mentioned groups of this type.

The compounds of the formula I are prepared by methods known per se, as described in the literature (for example in the standard works, such as Houben-Weyl, Methoden der Organischen, Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

Particular preference is given to compounds of the formula I in which $Y^1$ denotes H or F and $Y^2$ denotes H, in particular compounds of the following formulae:

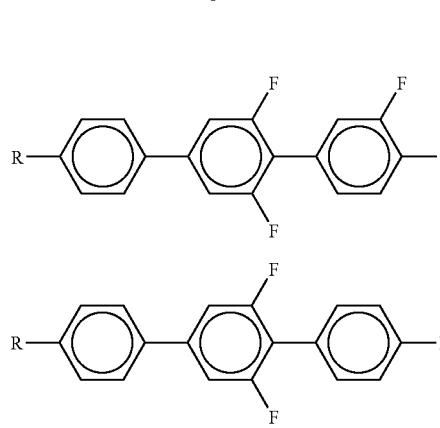

in which R has the meaning indicated in formula I. R preferably denotes straight-chain alkyl having 1 to 8 C atoms, furthermore alkenyl having 2 to 7 C atoms.

Further preferred embodiments are indicated below:

The medium additionally comprises one or more compounds selected from the group consisting of the following formulae:

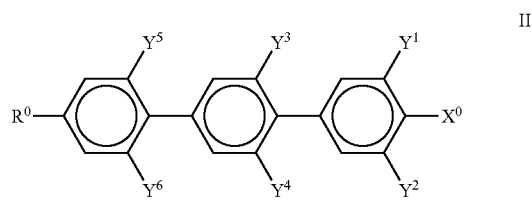

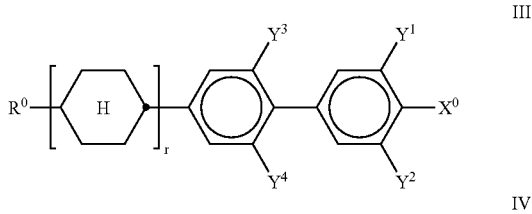

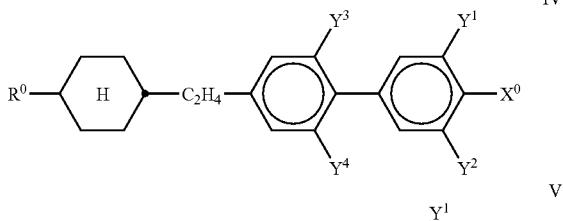

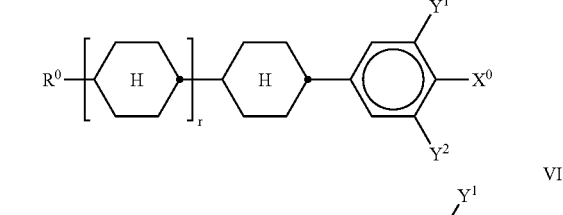

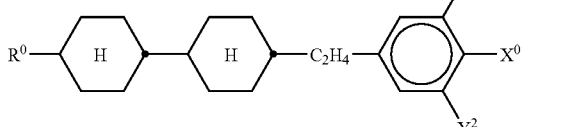

in which the individual radicals have the following meanings:
  $R^0$ n-alkyl, alkoxy, oxaalkyl, fluoroalkyl or alkenyl, each having up to 9 C atoms,
  $X^0$ F, Cl, halogenated alkyl, halogenated alkenyl, halogenated oxaalkyl, halogenated alkenyloxy or halogenated alkoxy having up to 6 C atoms,
  $Y^1$ to $Y^6$ each, independently of one another, H or F, where if $Y^{2-4}$ in formula II denote F, $Y^5$ and $Y^6$ do not simultaneously denote H,
  r 0 or 1;

The compounds of the formula II are preferably selected from the following compounds

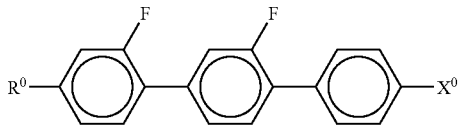

in which $R^0$ and $X^0$ have the meanings indicated above. Preferably, $R^0$ denotes alkyl having 1 to 8 C atoms and $X^0$ denotes F;

The compounds of the formula III are preferably selected from the group of the following compounds:

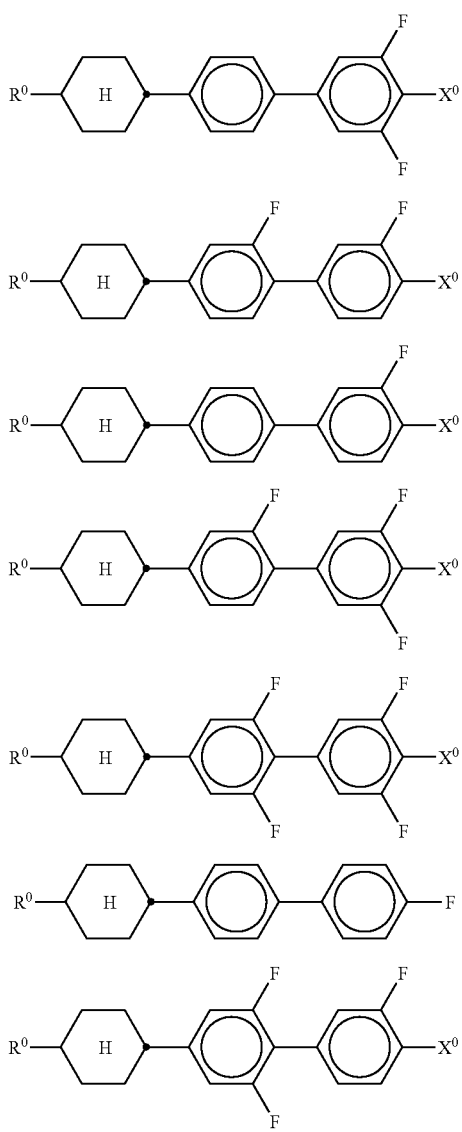

in which R⁰ and X⁰ have the meanings indicated above. Preferably, R⁰ denotes alkyl having 1 to 8 C atoms and X⁰ denotes F;

The medium comprises one or more compounds of the formula V in which r is 1 and R⁰ preferably denotes alkyl having 1 to 8 C atoms;

The medium comprises one or more compounds of the formula V in which r=0, X⁰=Cl and R⁰ preferably denotes alkyl having 1 to 8 C atoms;

The medium additionally comprises one or more compounds selected from the group consisting of the following formulae:

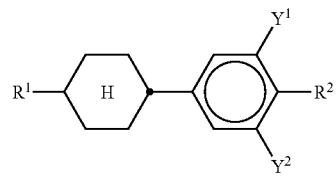

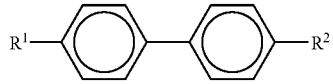

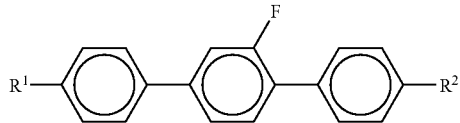

in which the individual radicals have the following meanings:

R¹ and R² each, independently of one another, n-alkyl, alkoxy, oxaalkyl, fluoroalkyl or alkenyl, each having up to 9 C atoms, Y¹ and Y² each, independently of one another, H or F;

The medium comprises one or more compounds of the formula VIII in which R¹ denotes alkyl having 1 to 8 C atoms and R² denotes alkenyl having 2 to 7 C atoms, particularly preferably one or more compounds of the following formula:

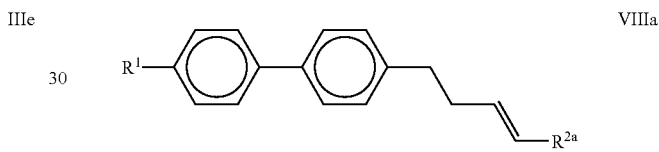

in which R¹ denotes alkyl having 1 to 8 C atoms and $R^{2a}$ denotes H, $CH_3$ or $C_2H_5$;

The medium comprises one or more compounds of the following formula:

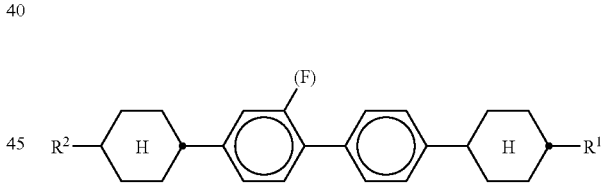

in which R¹ and R² have the meaning indicated above, and preferably each, independently of one another, denote alkyl having 1 to 8 C atoms;

The medium comprises further compounds, preferably selected from the group consisting of the following formulae:

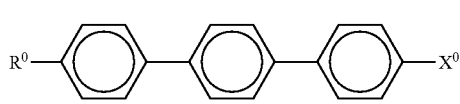

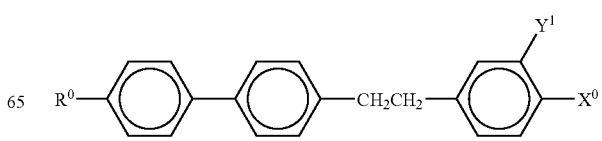

-continued

XIII
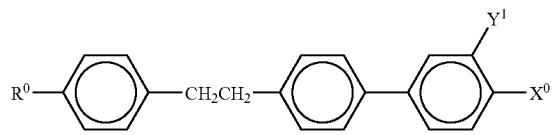

XIV
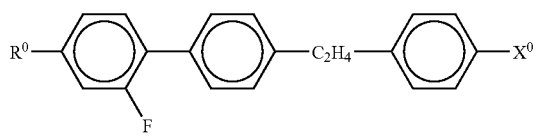

XV
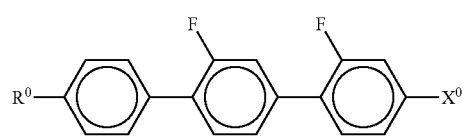

in which $R^0$ and $X^0$ have the meanings indicated above. Preferably, $R^0$ denotes alkyl or alkoxy having 1 to 8 C atoms and $X^0$ denotes F or Cl. The 1,4-phenylene rings may additionally be substituted by CN, Cl or F.

The medium additionally comprises one or more compounds selected from the group consisting of the following formulae:

XVI
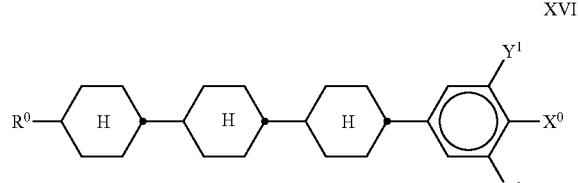

XVII
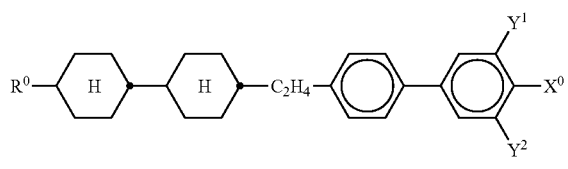

XVIII
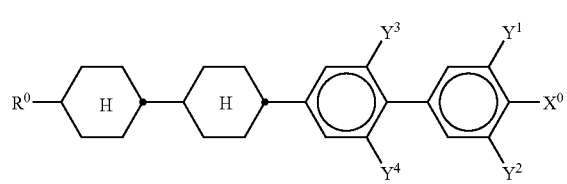

XIX
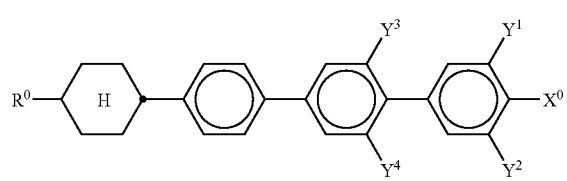

-continued

XX
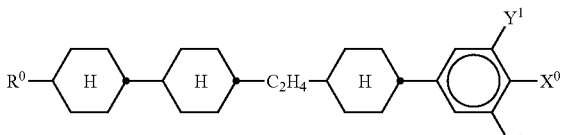

XXI
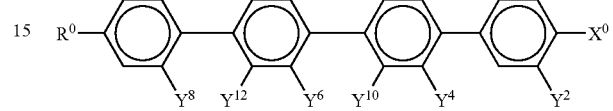

in which $R^0$ and $X^0$ each, independently of one another, have one of the meanings indicated above and $Y^{1-12}$ each, independently of one another, denote H or F. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

The medium comprises one or more compounds of the formula XXI, in particular in which one or more of the radicals $Y^{1-6}$ denote F, $Y^{7-8}$ denote H or F and $Y^{9-12}$ denote H;

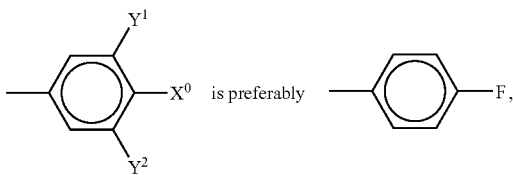 is preferably

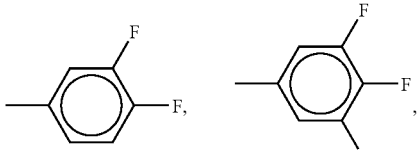

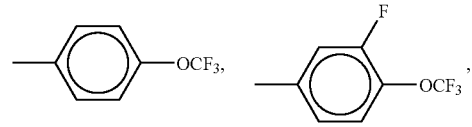

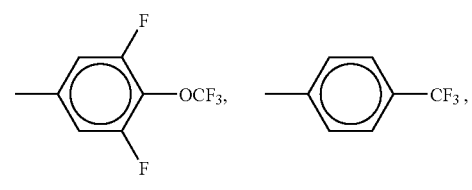

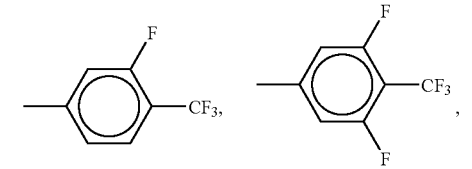

-continued

[Structures showing: phenyl-OCHF₂; difluorophenyl-OCHF₂; difluorophenyl-OCHF₂; phenyl-Cl; fluoro-chloro-phenyl or; trifluoro-chloro-phenyl]

$R^0$ is straight-chain alkyl or alkenyl having 2 to 7 C atoms;
$X^0$ is F;
$R^1$ and $R^2$ each, independently of one another, denote alkyl, alkoxy or fluoroalkyl having 1 to 8 C atoms or alkenyl having 2 to 7 C atoms;
The medium comprises one or more compounds of the formulae Q-1 to Q-3

Q-1: $R^0$—[H]—CF₂O—[phenyl with $Y^1$, $X^0$, $Y^2$]

Q-2: $R^0$—[H]—[H]—CF₂O—[phenyl with $Y^1$, $X^0$, $Y^2$]

Q-3: $R^0$—[phenyl]—[phenyl with F, $Y^3$]—CF₂O—[phenyl with $Y^1$, $X^0$, $Y^2$]

in which $R^0$, $X^0$, $Y^{1-3}$ have the meanings indicated above. $R^0$ preferably denotes alkyl having 1-8 C atoms or alkenyl having 2-7 C atoms.

$X^0$ is preferably F, furthermore OCF₃,
$Y^1$ is preferably F,
$Y^2$ is H or F and
$Y^3$ is H or F, preferably F.

The compounds Q-1 to Q-3 are preferably employed in amounts of 2-20% by weight, in particular 5-15% by weight.

The medium comprises one or more compounds of the formulae

A-1: alkyl—[cyclohexyl]—[cyclohexyl]—R'

A-2: alkyl—[cyclohexyl]—[cyclohexyl]—[phenyl]—R

A-3: alkyl—[cyclohexyl]—[phenyl]—[phenyl with L]—R

A-4: alkenyl—[cyclohexyl]—[cyclohexyl]—alkenyl* in which
alkyl denotes $C_{1-7}$-alkyl,
R' denotes $C_{1-7}$-alkyl or $C_{1-6}$-alkoxy or $C_{2-7}$-alkenyl,
alkenyl and alkenyl* each, independently of one another, denote $C_{2-7}$-alkenyl, and
L denotes H or F.

Particularly preferred compounds are

[Structures: alkyl-cyclohexyl-cyclohexyl-vinyl; alkyl-cyclohexyl-cyclohexyl-propenyl; alkyl-cyclohexyl-cyclohexyl-butenyl; alkyl-cyclohexyl-cyclohexyl-propenyl; vinyl-cyclohexyl-cyclohexyl-vinyl; vinyl-cyclohexyl-cyclohexyl-cyclohexyl-vinyl]

The mixtures according to the invention preferably comprise compounds A-1 to A-4 in amounts of 2-60% by weight, in particular 5-50% by weight.

The medium comprises one, two or more compounds of the formula Ia or Ib;
The medium comprises 2-40% by weight, preferably 3-30% by weight, particularly preferably 5-25% by weight, of compounds of the formula I;
The medium comprises compounds of the formulae I, II, III, VII, VIII, IX and X;
The proportion of compounds of the formulae II, III, VII, VIII, IX and X in the mixture as a whole is 40 to 95% by weight;

The medium comprises 5-50% by weight, particularly preferably 10-35% by weight, of compounds of the formula II;

The medium comprises 1-30% by weight, particularly preferably 2-15% by weight, of compounds of the formula III;

The medium comprises 3-45% by weight, particularly preferably 5-25% by weight, of compounds of the formula VII;

The medium comprises 3-25% by weight, particularly preferably 5-20% by weight, of compounds of the formula VIII;

The medium comprises 10-50% by weight, particularly preferably 15-40% by weight, of compounds of the formula IX;

The medium comprises 1-15% by weight, particularly preferably 1-10% by weight, of compounds of the formula X;

The medium comprises 0.5-10% by weight of compounds of the formula XXI.

It has been found that even a relatively small proportion of compounds of the formula I mixed with conventional liquid-crystal materials, but in particular with one or more compounds of the formulae II to X, results in a significant increase in the light stability and in very high values for the birefringence, with broad nematic phases having low smectic-nematic transition temperatures being observed at the same time, improving the storage stability. At the same time, the mixtures exhibit very good values for the VHR on UV exposure.

The term "alkyl" or "alkyl*" encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl*" encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}$/$k_{11}$ compared with alkyl and alkoxy radicals. The mixtures according to the invention are distinguished, in particular, by high $K_1$ values and thus have significantly faster response times than the mixtures from the prior art.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I and II to XX depends substantially on the desired properties, on the choice of the components of the formulae I to XXI, and the choice of any further components that may be present.

Suitable mixing ratios within the range indicated above can easily be determined from case to case.

The total amount of compounds of the formulae I to XXI in the mixtures according to the invention is not crucial. The mixtures can therefore comprise one or more further components for the purposes of optimization of various properties. However, the observed effect on the addressing times and the threshold voltage is generally greater, the higher the total concentration of compounds of the formulae I to XXI.

In a particularly preferred embodiment, the media according to the invention comprise compounds of the formulae II to VI (preferably II and III, in particular IIa and IIIa) in which $X^0$ denotes F, $OCF_3$, $OCHF_2$, OCH=$CF_2$, OCF=$CF_2$ or $OCF_2$—$CF_2H$. A favorable synergistic effect with the compounds of the formula I results in particularly advantageous properties. In particular, mixtures comprising compounds of the formulae I, IIa and IIIa are distinguished by their low threshold voltage.

The individual compounds of the formulae I to XXI and the sub-formulae thereof which can be used in the media according to the invention are either known or can be prepared analogously to the known compounds.

The invention also relates to electro-optical displays, such as, for example, STN or MLC displays, having two plane-parallel outer plates, which, together with a frame, form a cell, integrated non-linear elements for switching individual pixels on the outer plates, and a nematic liquid-crystal mixture of positive dielectric anisotropy and high specific resistance located in the cell, which contain media of this type, and to the use of these media for electro-optical purposes.

The liquid-crystal mixtures according to the invention enable a significant widening of the available parameter latitude. The achievable combinations of clearing point, viscosity at low temperature, thermal and UV stability and high optical anisotropy are far superior to previous materials from the prior art.

The mixtures according to the invention are particularly suitable for fast-switching monitors, TV sets, TV/monitor combination units and high Δn TFT applications, such as, for example, projection television sets and systems, LCOS and OCB, and also for notebooks.

The liquid-crystal mixtures according to the invention, while preferably retaining the nematic phase down to −20° C. and more preferably down to −30° C., particularly preferably down to −40° C., enable a clearing point preferably ≧70° C., more preferably ≧80° C., particularly preferably ≧95° C., simultaneously dielectric anisotropy values Δε preferably of ≧4, more preferably ≧5, and a high value for the specific resistance to be achieved, enabling excellent STN and MLC displays to be obtained. In particular, the mixtures are characterised by low operating voltages. The TN threshold voltage is preferably ≦6 V, particularly preferably ≦5 V, very particularly preferably ≦4 V.

The birefringence Δn of the liquid-crystal mixtures according to the invention is preferably ≧0.16, particularly preferably ≧0.18, very particularly preferably ≧0.20

It goes without saying that, through a suitable choice of the components of the mixtures according to the invention, it is also possible for higher clearing points (for example above 110° C.) to be achieved at higher threshold voltages or lower clearing points to be achieved at lower threshold voltages with retention of the other advantageous properties. At viscosities correspondingly increased only slightly, it is likewise possible to obtain mixtures having higher $\Delta\epsilon$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favorable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using -simple routine methods.

The flow viscosity $v_{20}$ at 20° C. is preferably $\leq 60$ mm$^2 \cdot$s$^{-1}$, particularly preferably $\leq 50$ mm$^2 \cdot$s$^{-1}$. The rotational viscosity $\gamma_1$ of the mixtures according to the invention at 20° C. is preferably $\leq 130$ mPa·s, particularly preferably $\leq 110$ mPa·s. The nematic phase range is preferably at least 90°, in particular at least 100°. This range preferably extends at least from $-20°$ to $+75°$.

A short response time is desired in liquid-crystal displays. This applies in particular to displays which are capable of video reproduction. For displays of this type, response times (total: $t_{on}+t_{off}$) of at most 25 ms are required. The upper limit for the response time is determined by the image refresh frequency. Besides the rotational viscosity $\gamma_1$, the tilt angle also influences the response time. In particular for LCOS displays, very short response times of below 10 ms are required, which is achieved through extremely small layer thicknesses of <1.5 microns. This in turn requires liquid-crystal mixtures having high $\Delta$n values.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on exposure to UV than analogous mixtures comprising cyano-phenylcyclohexanes of the formula

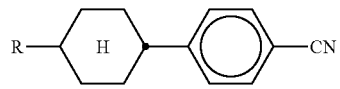

or esters of the formula

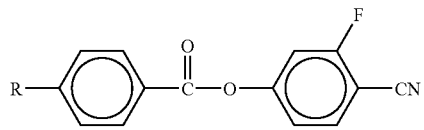

instead of the compounds of the formula I. The light stability and UV stability of the mixtures according to the invention are considerably better, i.e. they exhibit a significantly smaller decrease in the HR on exposure to light or UV. Even low concentrations (<10% by weight) of the compounds of the formula I increase the HR in the mixtures by 6% or more compared with mixtures from the prior art.

The construction of the MLC display according to the invention from polarizers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba, antioxidants, free-radical scavengers, etc. For example, 0-15% of pleochroic dyes or chiral dopants can be added. Suitable stabilisers and dopants are mentioned below in Tables C and D.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

C denotes a crystalline phase, S a smectic phase, $S_c$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2.0 times the value of $V_{10}$. $\Delta$n denotes the optical anisotropy. $\Delta\epsilon$ denotes the dielectric anisotropy ($\Delta\epsilon=\epsilon_{\parallel}-\epsilon_{\perp}$, where $\epsilon_{\parallel}$ denotes the dielectric constant parallel to the longitudinal molecular axes and $\epsilon_{\perp}$ denotes the dielectric constant perpendicular thereto). The electro-optical data are measured in a TN cell at the 1st minimum (i.e. at a d·$\Delta$n value of 0.5 µm) at 20° C., unless expressly stated otherwise. The optical data are measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}, R^{2*}, L^{1*}, L^{2*}, L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $OC_nH_{2n+1}$ | $C_mH_{2m+1}$ | H | H |
| nO.m | $C_nH_{2n+1}$ | $OC_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nmF | $C_nH_{2n+1}$ | $C_mH_{2m+1}$ | F | H |
| nOCF$_3$ | $C_nH_{2n+1}$ | OCF$_3$ | H | H |
| nOCF3.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are given in Tables A and B.

TABLE A

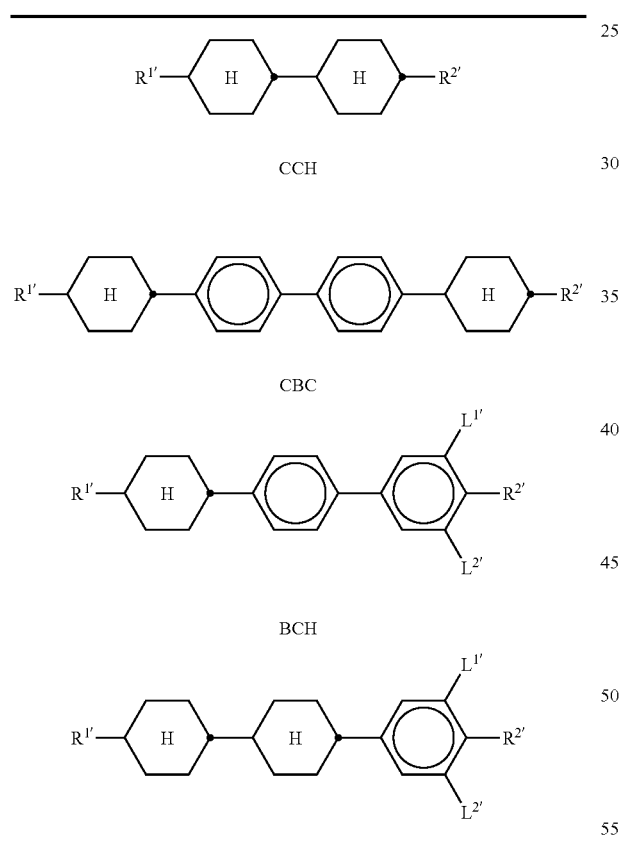

TABLE A-continued

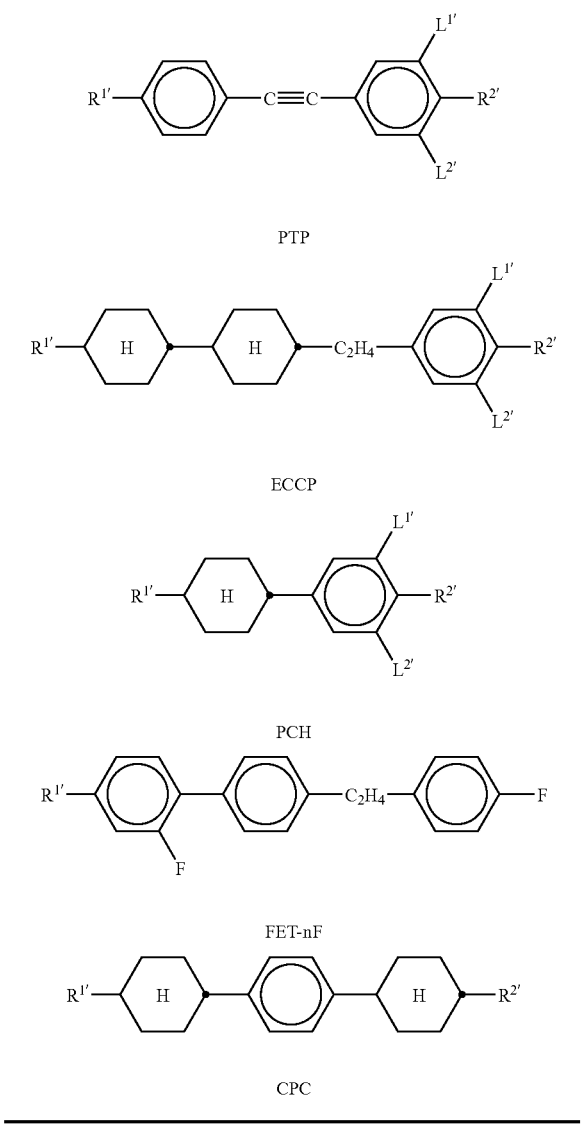

TABLE B
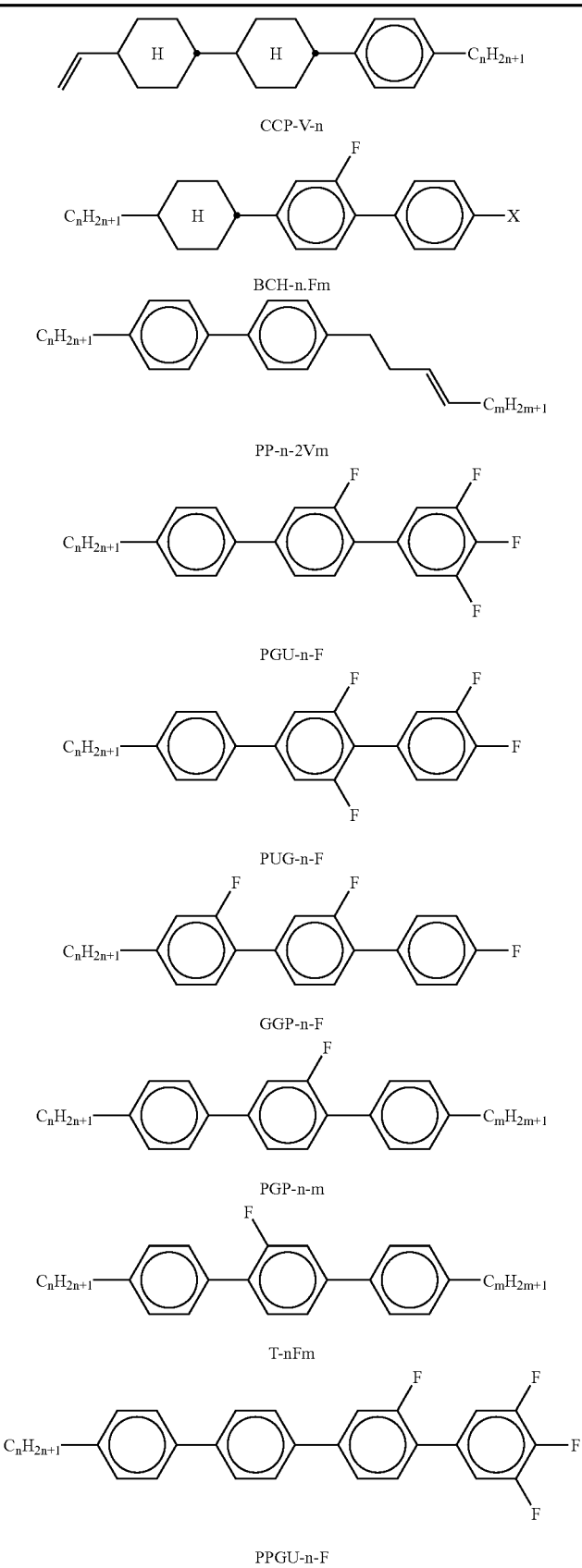

TABLE B-continued

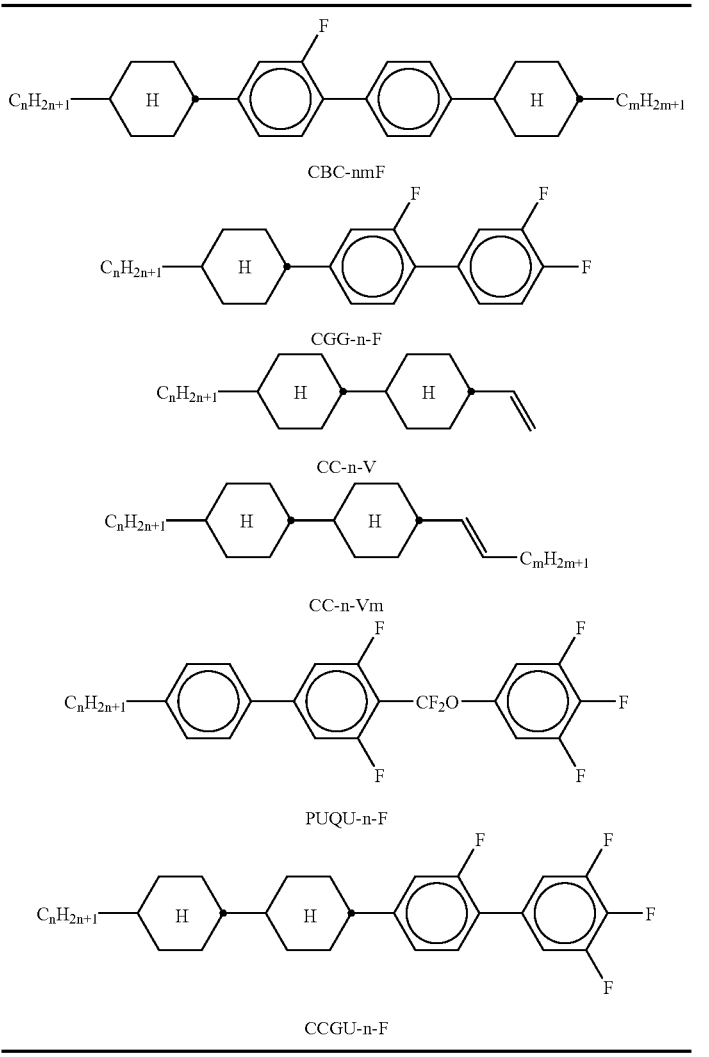

Particular preference is given to liquid-crystalline mixtures which, besides the compounds of the formula I, comprise at least one, two, three, four or more compounds from Table B.

TABLE C

Table C shows possible dopants which are generally added to the mixtures according to the invention.
The mixtures preferably comprise 0-10% by weight, in particular 0.01-5% by weight and particularly preferably 0.01-3% by weight of dopants.

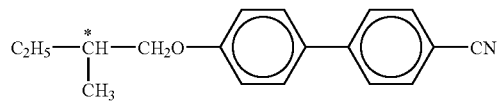

C 15

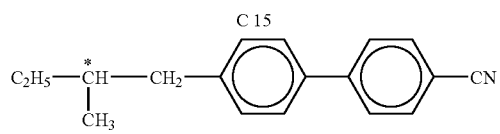

CB 15

TABLE C-continued
Table C shows possible dopants which are generally added to the mixtures according to the invention.
The mixtures preferably comprise 0-10% by weight, in particular 0.01-5% by weight and particularly preferably 0.01-3% by weight of dopants.
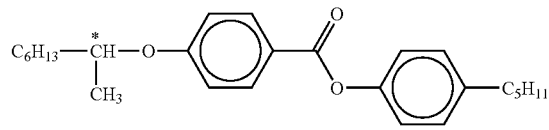
CM 21
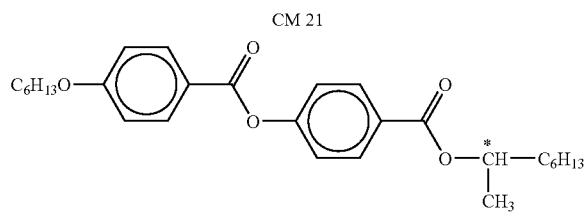
R/S-811
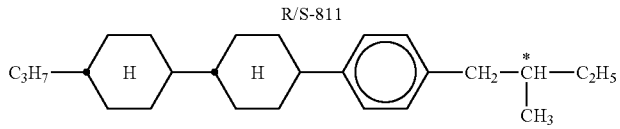
CM 44
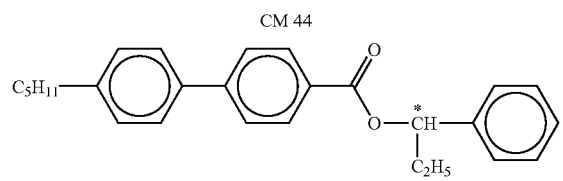
CM 45
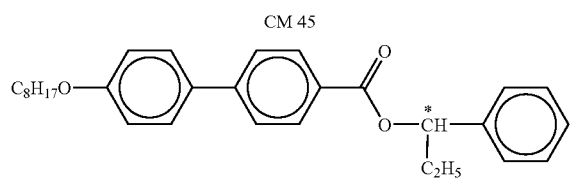
CM 47
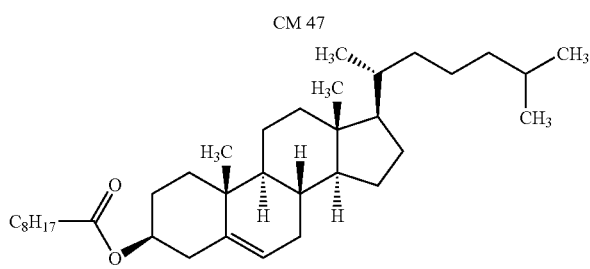
CN
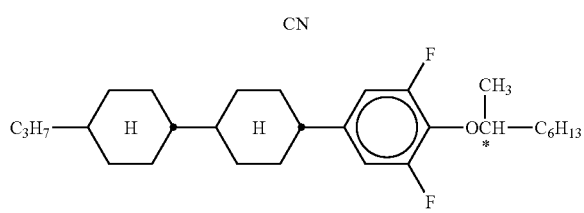
R/S-2011

TABLE C-continued

Table C shows possible dopants which are generally added to the mixtures according to the invention.
The mixtures preferably comprise 0-10% by weight, in particular 0.01-5% by weight and particularly preferably 0.01-3% by weight of dopants.

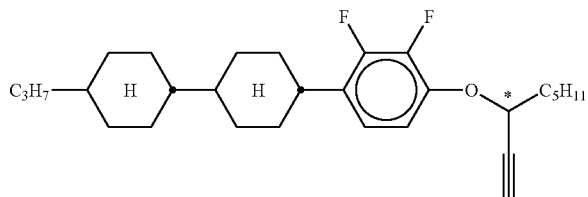

R/S-3011

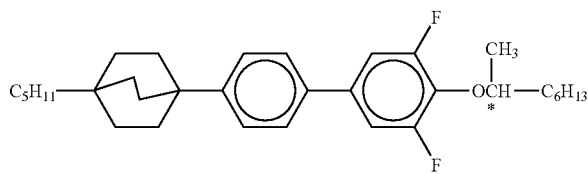

R/S-4011

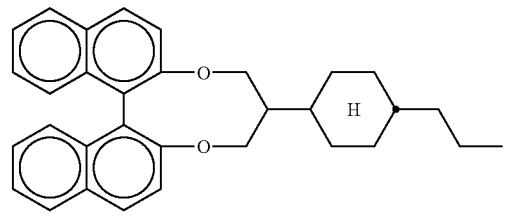

R/S-5011

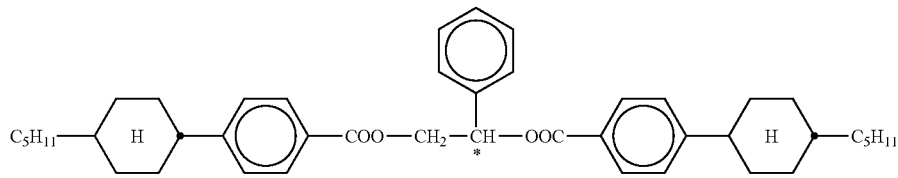

R/S-1011

TABLE D

Stabilisers which can be added, for example, to the mixtures according to the invention in amounts of 0-10% by weight are mentioned below.

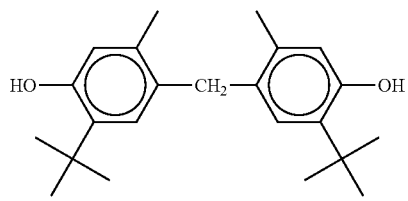

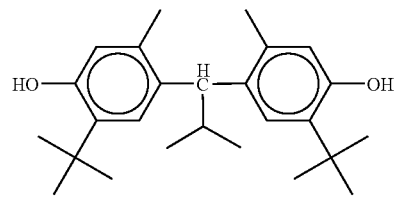

TABLE D-continued
Stabilisers which can be added, for example, to the mixtures according to the invention in amounts of 0-10% by weight are mentioned below.
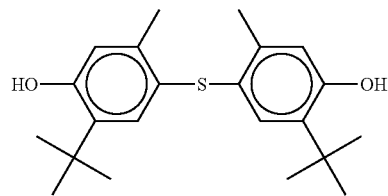
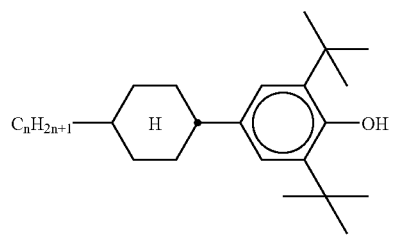
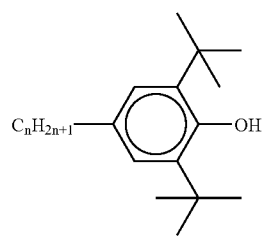
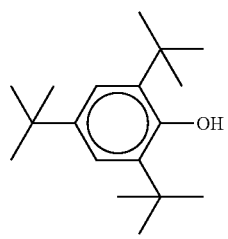
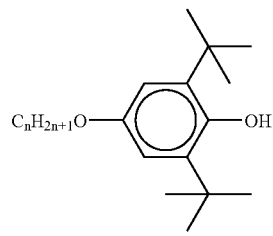
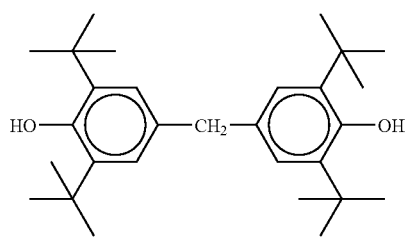

TABLE D-continued
Stabilisers which can be added, for example, to the mixtures according to the invention in amounts of 0-10% by weight are mentioned below.
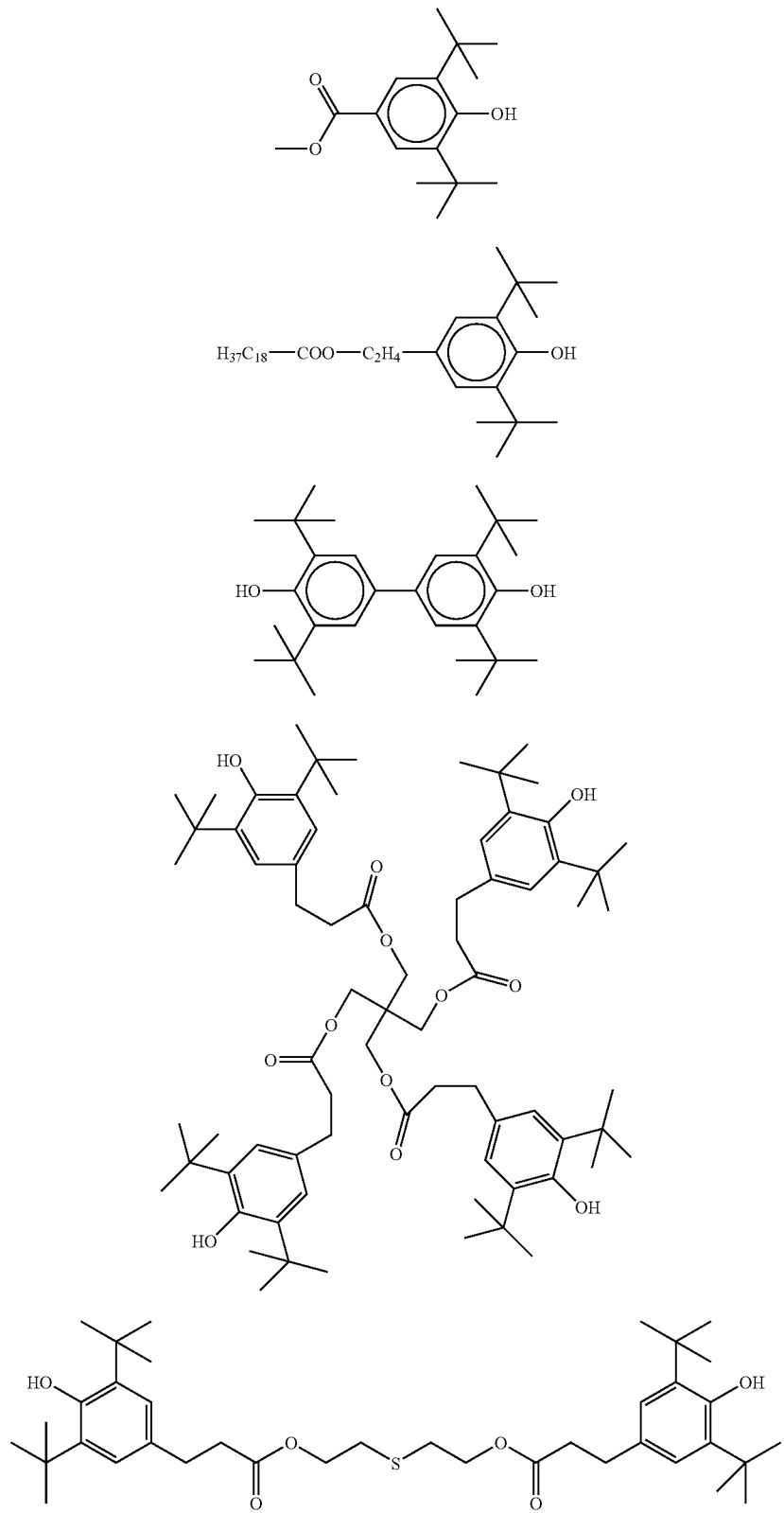

TABLE D-continued
Stabilisers which can be added, for example, to the mixtures according to the invention in amounts of 0-10% by weight are mentioned below.
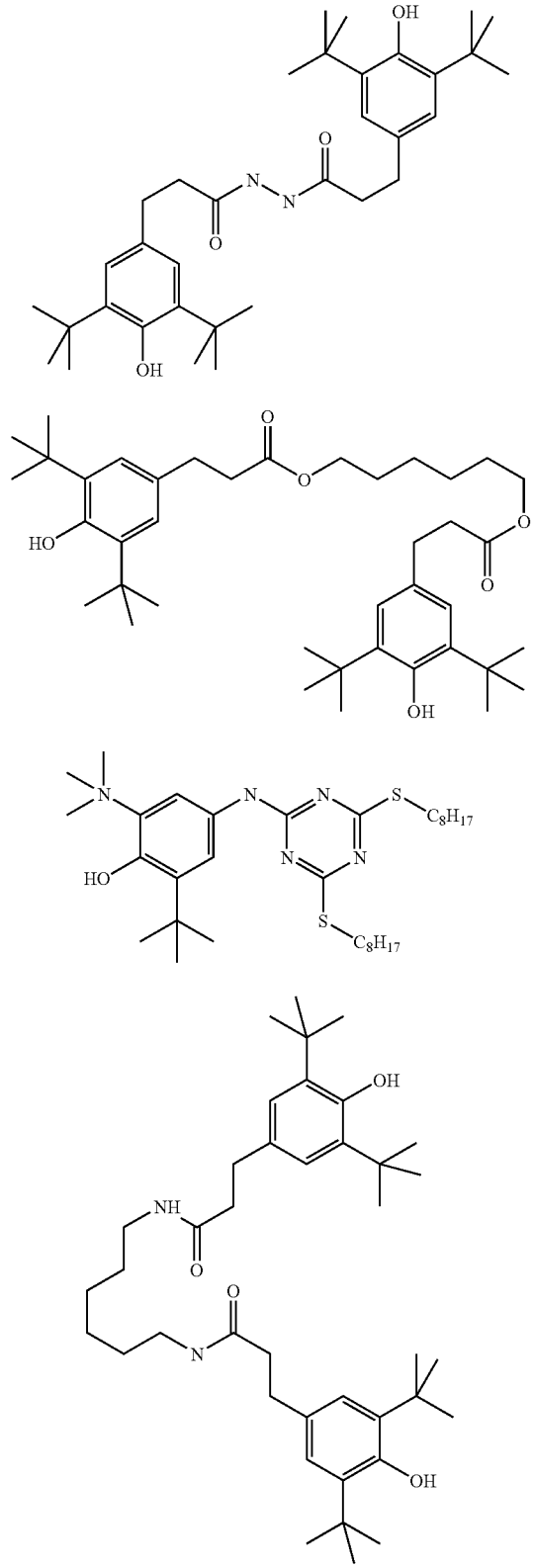

TABLE D-continued
Stabilisers which can be added, for example, to the mixtures according to the invention in amounts of 0-10% by weight are mentioned below.
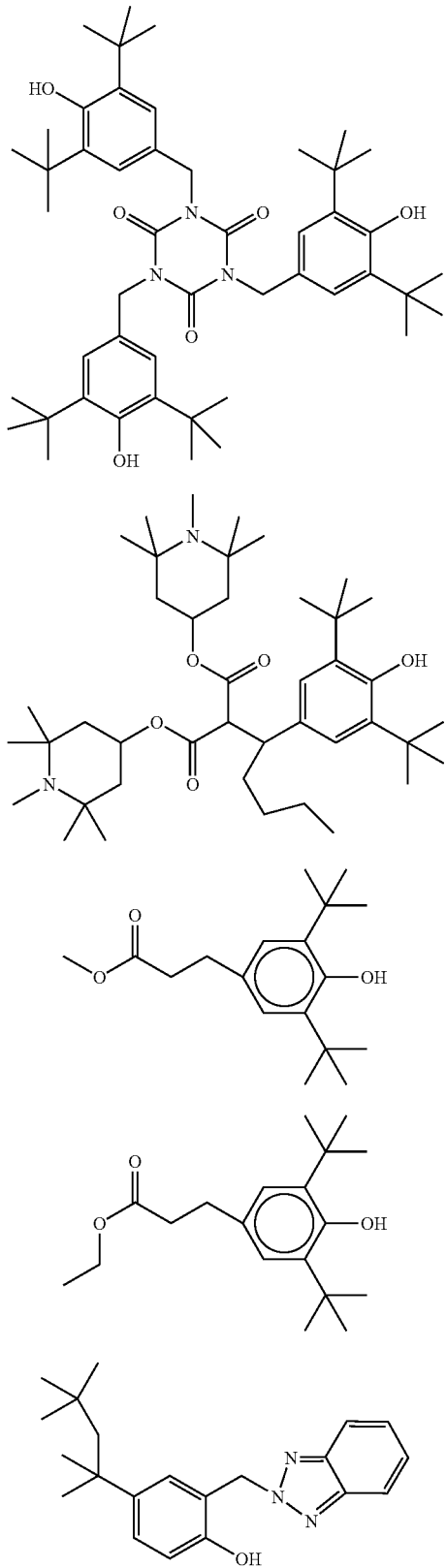

TABLE D-continued
Stabilisers which can be added, for example, to the mixtures according to
the invention in amounts of 0-10% by weight are mentioned below.
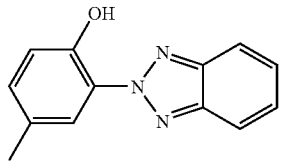
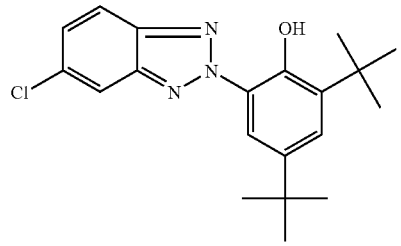
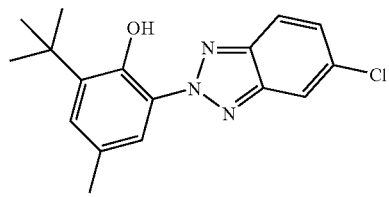
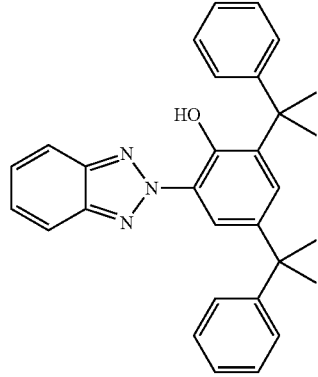
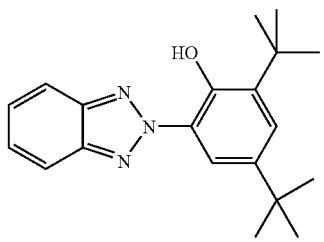
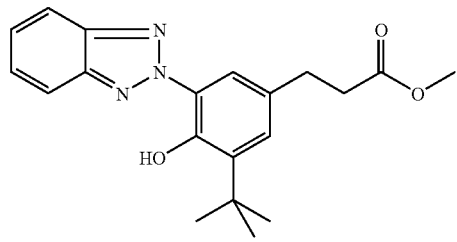

TABLE D-continued
Stabilisers which can be added, for example, to the mixtures according to the invention in amounts of 0-10% by weight are mentioned below.
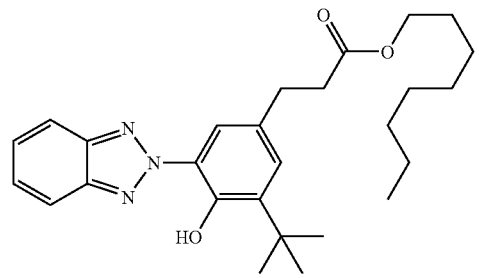
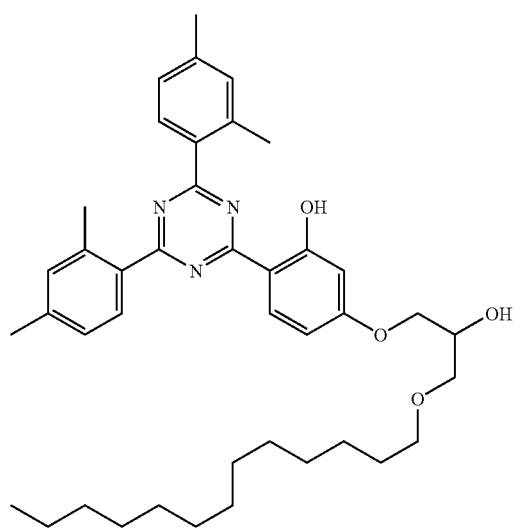
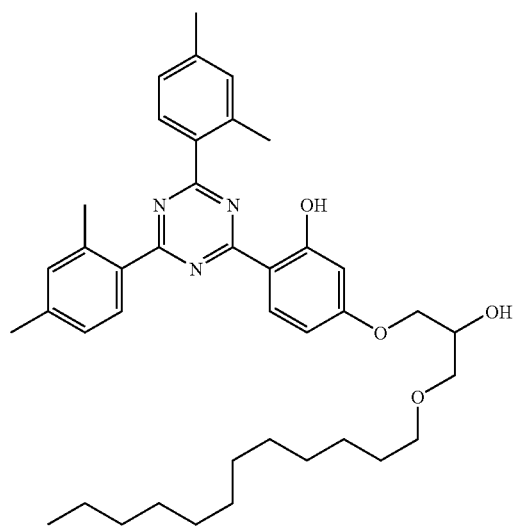

TABLE D-continued

Stabilisers which can be added, for example, to the mixtures according to the invention in amounts of 0-10% by weight are mentioned below.

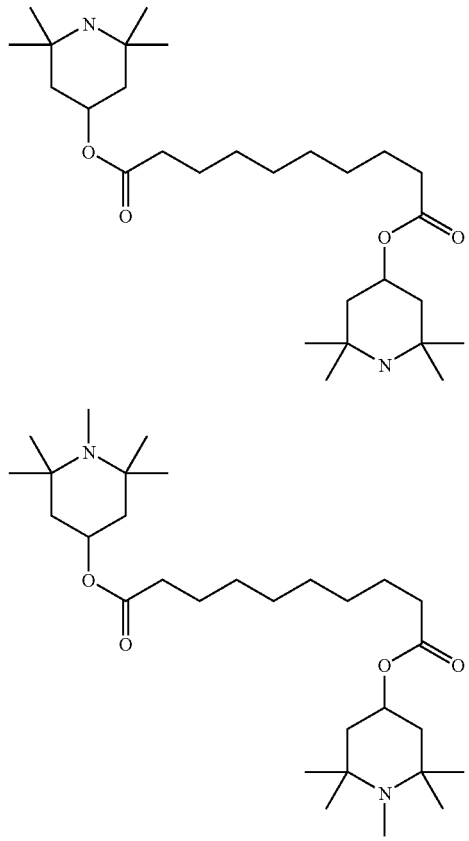

The following examples are intended to explain the invention without restricting it. Above and below, percentages denote percent by weight. All temperatures are indicated in degrees Celsius. m.p. denotes melting point, cl.p. denotes clearing point. Furthermore, C=crystalline state, N=nematic phase, S=smectic phase and I=isotropic phase. The data between these symbols represent the transition temperatures. Δn denotes optical anisotropy (589 nm, 20° C.). The flow viscosity $v_{20}$ (mm²/sec) and the rotational viscosity $γ_1$ (mPa·s) are each determined at 20° C.

All concentrations in this application, unless explicitly stated otherwise, are indicated in percent by weight and relate to the corresponding mixture or mixture component. All physical properties are determined in accordance with "Merck Liquid Crystals, Physical Properties of Liquid Crystals" Status November 1997, Merck KGaA, Germany, and apply to a temperature of 20° C., unless explicitly stated otherwise. An is determined at 589 nm and Δε at 1 kHz.

EXAMPLE 1

| | | | |
|---|---|---|---|
| PCH-301 | 14.00% | S → N [° C.]: | <−30.0 |
| PP-1-2V1 | 10.00% | Clearing point [° C.]: | 70.0 |
| PGP-2-3 | 15.00% | Δn [589 nm, 20° C.]: | 0.2046 |
| PGP-2-4 | 15.00% | Δε [kHz, 20° C.]: | +5.3 |
| GGP-2-F | 9.00% | $γ_1$ [mPa·s, 20° C.]: | 170 |

-continued

| | |
|---|---|
| GGP-3-F | 12.00% |
| GGP-5-F | 6.00% |
| PUG-3-F | 10.00% |
| BCH-3F.F | 6.00% |
| CBC-33F | 3.00% |

The mixture exhibits high light stability with a service life of >500 h in the panel on exposure to visible light.

EXAMPLE 2

| | | | |
|---|---|---|---|
| CC-3-V | 42.00% | Clearing point [° C.]: | 75.0 |
| CC-3-V1 | 12.00% | Δn [589 nm, 20° C.]: | 0.12 |
| PGU-2-F | 7.00% | Δε [kHz, 20° C.]: | +5.0 |
| PGU-3-F | 9.00% | $γ_1$ [mPa·s, 20° C.]: | 55 |
| PUG-3-F | 8.00% | $V_{10}$ [V]: | 1.93 |
| PGP-2-3 | 6.00% | | |
| PGP-2-4 | 5.00% | | |
| CCP-V-1 | 5.00% | | |
| CCGU-3-F | 3.00% | | |
| CBC-33 | 3.00% | | |

This mixture is particularly suitable for monitor applications and has high stability in the UV region and visible light.

EXAMPLE 3

| | | | | |
|---|---|---|---|---|
| CC-3-V | 41.00% | Clearing point [° C.]: | 75.0 |
| CC-3-V1 | 11.00% | Δn [589 nm, 20° C.]: | 0.12 |
| PUQU-3-F | 5.00% | Δε [kHz, 20° C.]: | +5.2 |
| PGU-2-F | 6.00% | $\gamma_1$ [mPa·s, 20° C.]: | 57 |
| PGU-3-F | 5.00% | $V_{10}$ [V]: | 1.90 |
| PUG-3-F | 8.00% | | |
| PGP-2-3 | 6.00% | | |
| PGP-2-4 | 6.00% | | |
| CCP-V-1 | 5.00% | | |
| CCGU-3-F | 4.00% | | |
| CBC-33 | 3.00% | | |

This mixture is particularly suitable for monitor applications and has high stability in the UV region and visible light.

EXAMPLE 4

| | | | | |
|---|---|---|---|---|
| CC-3-V | 32.00% | Clearing point [° C.]: | 74.5 |
| PGU-2-F | 6.00% | Δn [589 nm, 20° C.]: | 0.12 |
| PGU-3-F | 12.00% | Δε [kHz, 20° C.]: | +9.0 |
| PUG-3-F | 8.00% | $\gamma_1$ [mPa·s, 20° C.]: | 70 |
| PUQU-3-F | 10.00% | $V_{10}$ [V]: | 1.40 |
| CCP-3OCF$_3$ | 7.00% | | |
| PGP-2-3 | 2.00% | | |
| CCP-V-1 | 18.00% | | |
| CCGU-3-F | 5.00% | | |

This mixture is particularly suitable for notebooks and has high stability in the UV region and visible light.

The entire disclosure of all applications, patents and publications, cited herein and of corresponding German application No. 10 2005 008 683.7, filed Feb. 25, 2005 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium, comprising:
one or more compounds of the formula Ia of Ib:

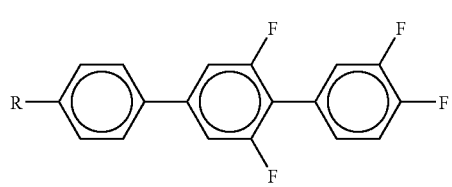

Ia

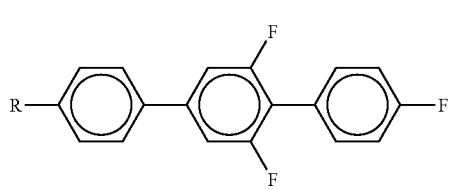

Ib in which

R is a halogenated or unsubstituted alkyl or alkoxy radical having 1 to 15 C atoms, where one or more CH$_2$ groups in these radicals, independently of one another, are optionally replaced by —C≡C—, —CF$_2$O—, —CH=CH—,

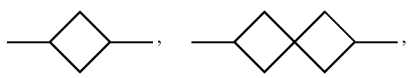

—O—, —CO—O— or —O—CO— in such a way that O atoms are not linked directly to one another; and
one or more compounds of at least one of formulae II', IX, XI-XV, XXI and Q-3:

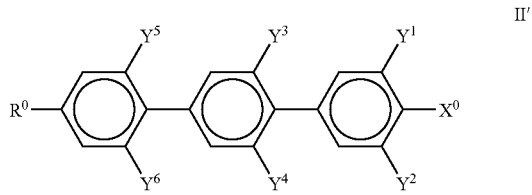

II'

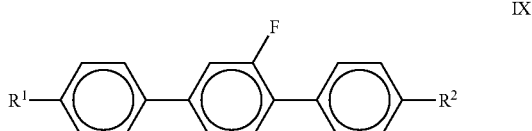

IX

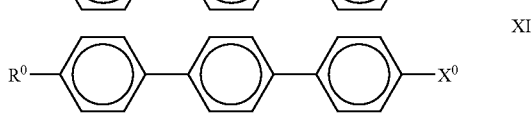

XI

XII

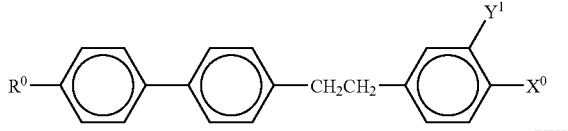

XIII

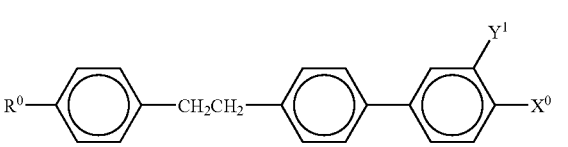

XIV

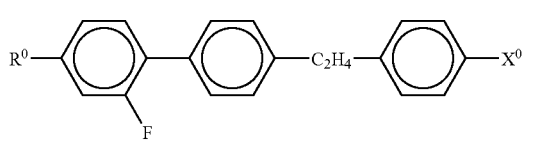

XV

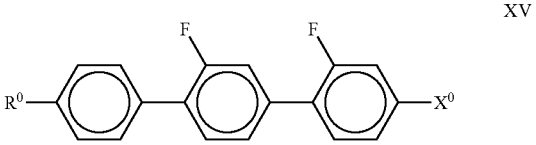

XXI

-continued

Q-3

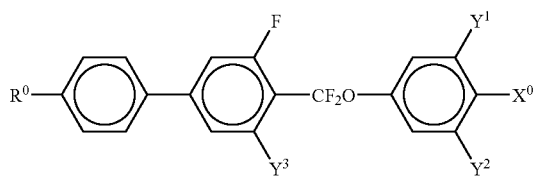

wherein:
R⁰ is n-alkyl, alkoxy, oxaalkyl, fluoroalkyl or alkenyl, each having 1 to 9 C atoms,
R¹ and R² each, independently of one another, are n-alkyl, alkoxy, oxaalkyl, fluoroalkyl or alkenyl, each having 1 to 9 C atoms,
X⁰ is F, Cl, or halogenated alkyl, halogenated alkenyl, halogenated oxaalkyl, halogenated alkenyloxy or halogenated alkoxy having 1 to 6 C atoms, and
Y¹ to Y¹² each, independently of one another are, H or F, provided that for formula II', Y⁴, Y⁵ and Y⁶ are each H.

2. A liquid-crystalline medium according to claim 1 which, additionally comprises one or more compounds selected from the group consisting of the compounds of the following formulae:

II
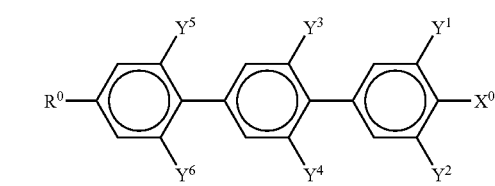

III
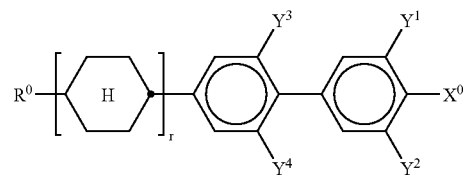

IV
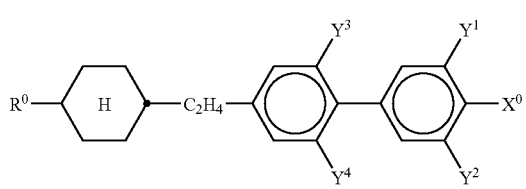

V
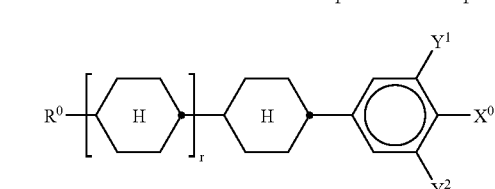

VI
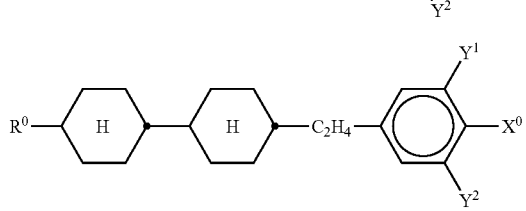

in which the individual radicals have the following meanings:

R⁰ is n-alkyl, alkoxy, oxaalkyl, fluoroalkyl or alkenyl, each having 1 to 9 C atoms,
X⁰ is F, Cl, or halogenated alkyl, halogenated alkenyl, halogenated oxaalkyl, halogenated alkenyloxy or halogenated alkoxy having 1 to 6 C atoms,
Y¹ to Y⁶ each, independently of one another are, H or F, provided that if Y²⁻⁴ in formula II ends denote F, Y⁵ and Y⁶ do not simultaneously denote H,
r 0 or 1, and provided that the compound of formula II is different from the compound fo formula Ia, Ib, II', IX or XI.

3. A liquid-crystalline medium, which comprises:
one or more compounds of the following formula I I
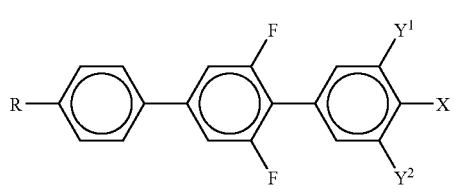

in which
R is a halogenated or unsubstituted alkyl or alkoxy radical having 1 to 15 C atoms, where one or more CH₂ groups in these radicals, independently of one another are optionally replaced by —C≡C—, —CF₂O—, —CH=CH—,

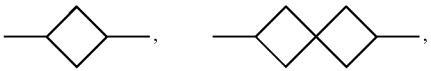

—O—, —CO—O— or —O—CO— in such a way that O atoms are not linked directly to one another,
X denotes F, Cl, CN, SF₅, SCN, NCS, or a halogenated alkyl radical, a halogenated alkenyl radical, a halogenated alkoxy radical or a halogenated alkenyloxy radical having 1 to 6 C atoms, and
Y¹ and Y² each, independently of one another, denote H or F; and
one or more compounds of at least one of formulae II', IX, XI-XV, XXI and Q-3:

II'
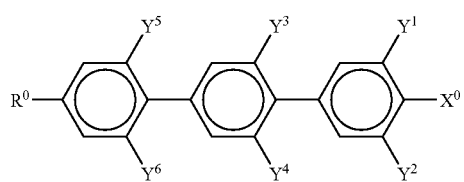

IX

XI
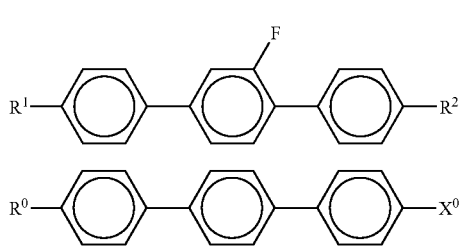

-continued

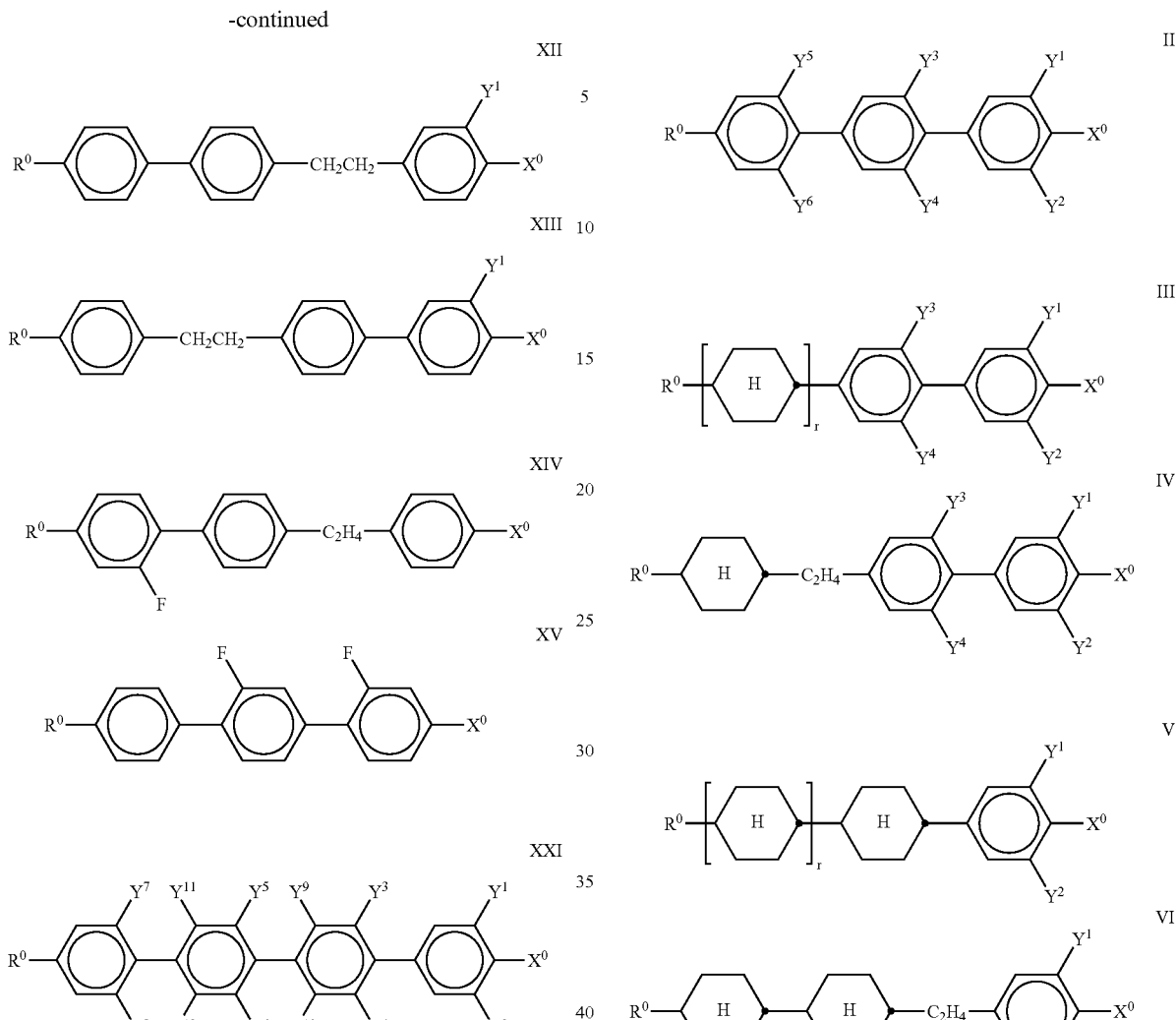

wherein:
- $R^0$ is n-alkyl, alkoxy, oxaalkyl, fluoroalkyl or alkenyl, each having 1 to 9 C atoms,
- $R^1$ and $R^2$ each, independently of one another, are n-alkyl, alkoxy, oxaalkyl, fluoroalkyl or alkenyl, each having 1 to 9 C atoms,
- $X^0$ is F, Cl, or halogenated alkyl, halogenated alkenyl, halogenated oxaalkyl, halogenated alkenyloxy or halogenated alkoxy having 1 to 6 C atoms, and
- $Y^1$ to $Y^{12}$ each, independently of one another are, H or F, provided that for formula II', $Y^4$, $Y^5$ and $Y^6$ are each H; and one or more compounds selected from the group consisting of the compounds of the following formulae:

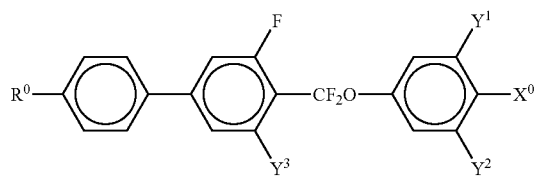

in which the individual radicals have the following meanings:
- $R^0$ is n-alkyl, alkoxy, oxaalkyl, fluoroalkyl or alkenyl, each having 1 to 9 C atoms,
- $X^0$ is F, Cl, or halogenated alkyl, halogenated alkenyl, halogenated oxaalkyl, halogenated alkenyloxy or halogenated alkoxy having 1 to 6 C atoms,
- $Y^1$ to $Y^6$ each, independently of one another are, H or F, provided that if $Y^{2-4}$ in formula II each denote F, $Y^5$ and $Y^6$ do not simultaneously denote H, and
- r 0 or 1, provided that the compound of formula II is different from the compound of formula I, II', IX, XI or IIa; and one or more compounds of the following formula

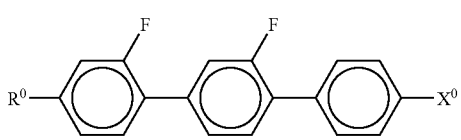

in which $R^0$ and $X^0$ have the meanings indicated above.

4. A liquid-crystalline medium according to claim 3, which comprises one or more compounds of the formula IIa in which $R^0$ denotes alkyl having 1 to 8 C atoms and $X^0$ denotes F.

5. A liquid-crystalline medium according to claim 2, which comprises one or more compounds of the following formulae

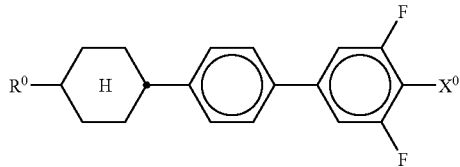

IIIa

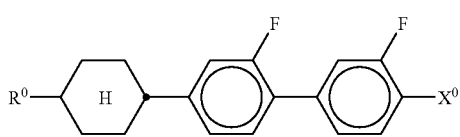

IIIb

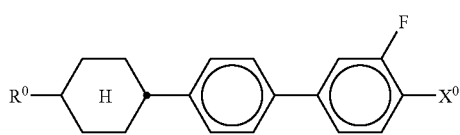

IIIc

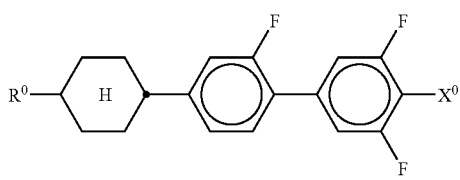

IIId

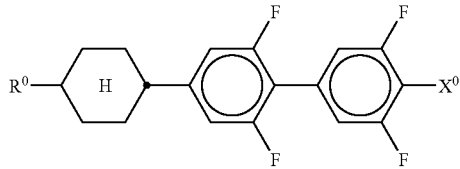

IIIe

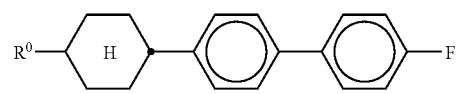

IIIf

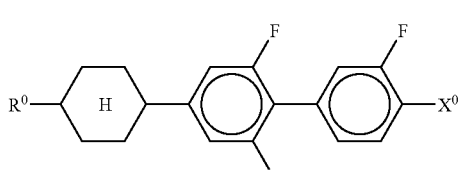

IIIg in which $R^0$ and $X^0$ have the meanings indicated in claim 2.

6. A liquid-crystalline medium according to claim 5, which comprises one or more compounds of the formula IIIa in which $R^0$ denotes alkyl having 1 to 8 C atoms and $X^0$ denotes F.

7. A liquid-crystalline medium, which comprises:

one or more compounds of the formula I consisting of compounds of the following formulae

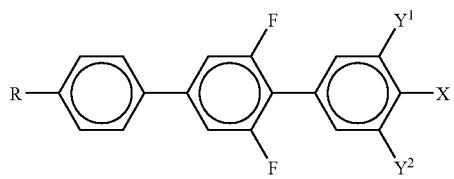

I in which

R is a halogenated or unsubstituted alkyl or alkoxy radical having 1 to 15 C atoms, where one or more $CH_2$ groups in these radicals, independently of one another are optionally replaced by —C≡C—, —$CF_2$O—, —CH=CH—,

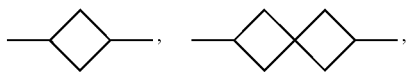

—O—, —CO—O— or —O—CO— in such a way that 0 atoms are not linked directly to one another, X denotes F, Cl, CN, SF5, SCN, NCS, or a halogenated alkyl radical, a halogenated alkenyl radical, a halogenated alkoxy radical or a halogenated alkenyloxy radical having 1 to 6 C atoms, and $Y^1$ and $Y^2$ each, independently of one another, denote H or F: and one or more compounds of at least one of formulae II', IX, XI-XV, XXI and Q3:

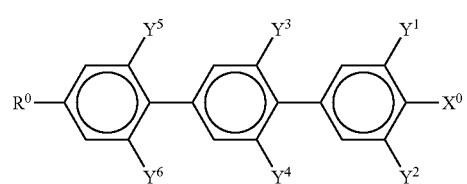

II'

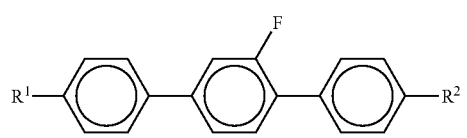

IX

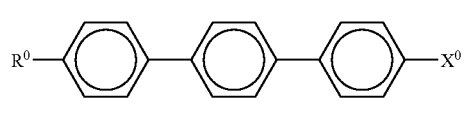

XI

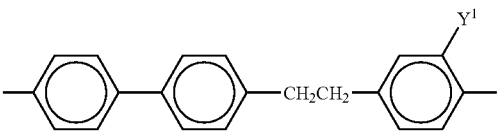

XII

-continued

XIII
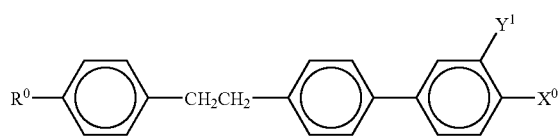

XIV
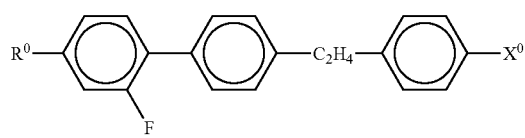

XV
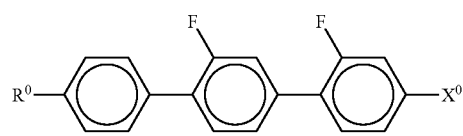

XXI
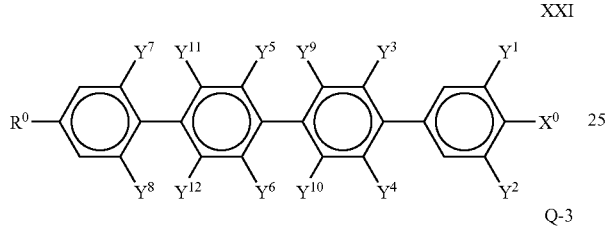

Q-3
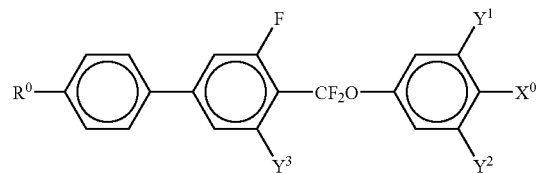

wherein:
- $R^0$ is n-alkyl, alkoxy, oxaalkyl, fluoroalkyl or alkenyl, each having 1 to 9 C atoms,
- $R^1$ and $R^2$ each, independently of one another, are n-alkyl, alkoxy, oxaalkyl, fluoroalkyl or alkenyl, each having 1 to 9 C atoms,
- $X^0$ is F, Cl, or halogenated alkyl, halogenated alkenyl, halogenated oxaalkyl, halogenated alkenyloxy or halogenated alkoxy having 1 to 6 C atoms, and $Y^1$ to $Y^{12}$ each, independently of one another are, H or F, provided that for formula II', $Y^4$, $Y^5$ and $Y^6$ are each H; and one or more compounds selected from the group consisting of compounds of the following formulae VII
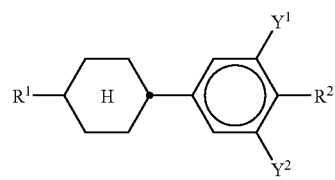

VIII
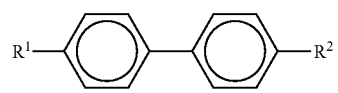

in which the individual radicals have the following meanings:

$R^1$ and $R^2$ each, independently of one another, n-alkyl, alkoxy, oxaalkyl, fluoroalkyl pg, or alkenyl, each having 1 to 9 C atoms, and $Y^1$ and $Y^2$ each, independently of one another, H or F.

8. A liquid-crystalline medium, which comprises:
one or more compounds of the following formula I I
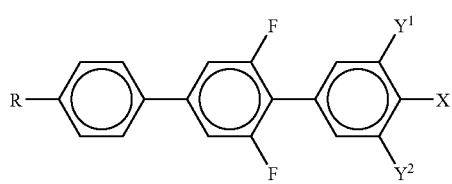

in which
R is a halogenated or unsubstituted alkyl or alkoxy radical having 1 to 15 C atoms, where one or more $CH_2$ group s in these radicals, independently of one another, are optionally replaced by —C≡C—, —$CF_2$O—, —CH=CH—,

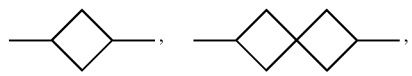

—)—, —CO—O— or —O—CO— in such a way that 0 atoms are not linked directly to one another, X denotes F, Cl, CN, $SF_5$, SCN, NCS, or a halogenated alkyl radical, a halogenated alkenyl radical, a halogenated alkoxy radical or a halogenated alkenyloxy radical having 1 to 6 C atoms, and $Y^1$ and $Y^2$ each, independently of one another, denote H or F; and one or more compounds of at least one of formulae II', IX, XI-XV, XXI and Q-3:

II'
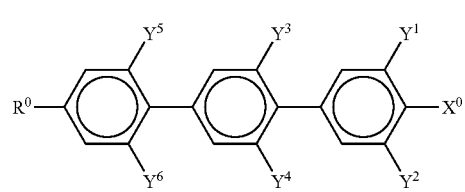

IX
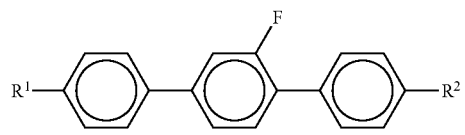

XI

XII
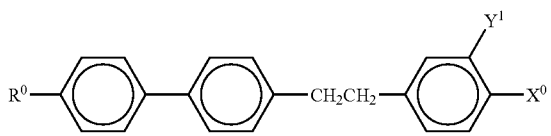

-continued

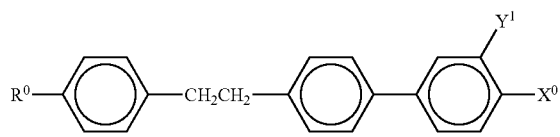
XIII

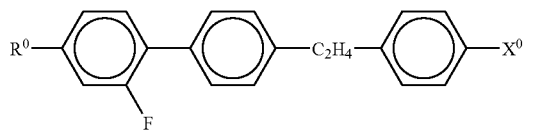
XIV

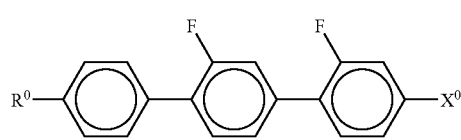
XV

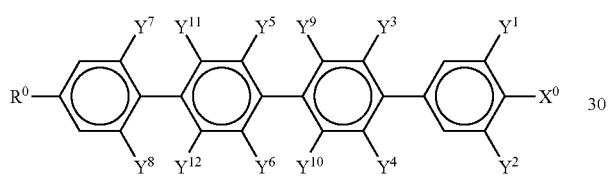
XXI

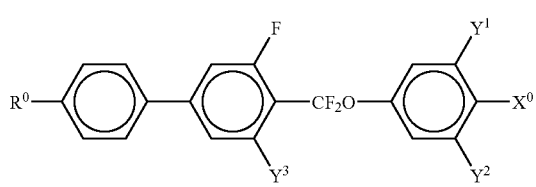
Q-3 wherein:
R⁰ is n-alkyl, alkoxy, oxaalkyl, fluoroalkyl or alkenyl, each having 1 to 9 C atoms,
R¹ and R² each, independently of one another, are n-alkyl, alkoxy, oxaalkyl, fluoroalkyl or alkenyl, each having 1 to 9 C atoms,
X⁰ is F, Cl, or halogenated alkyl, halogenated alkenyl, halogenated oxaalkyl, halogenated alkenyloxy or halogenated alkoxy having 1 to 6 C atoms, and
$Y^1$ to $Y^{12}$ each, independently of one another are, H or F, provided that for formula II', $Y^4$, $Y^5$ and $Y^6$ are each H; and one or more compounds selected from the group consisting of the compounds of the following formulae:

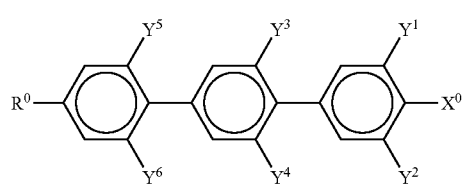
II

-continued

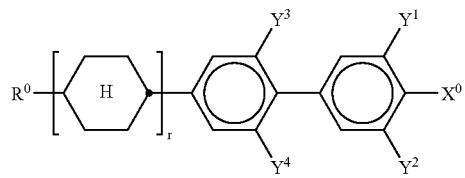
III

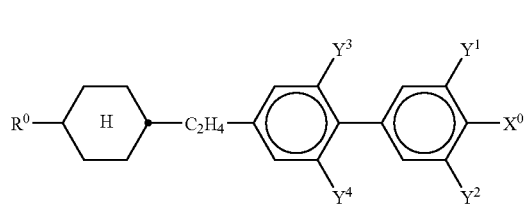
IV

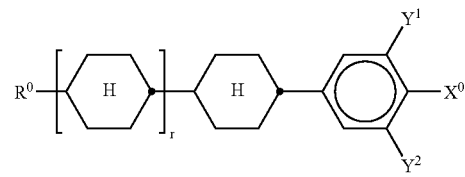
V

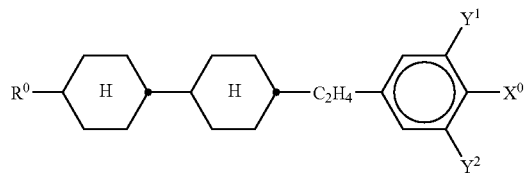
VI in which the individual radicals have the following meanings:
R⁰ is n-alkyl, alkoxy, oxaalkyl, fluoroalkyl or alkenyl, each having 1 to 9 C atoms,
X⁰ is F, Cl, or halogenated alkyl, halogenated alkenyl, halogenated oxaalkyl, halogenated alkenyloxy or halogenated alkoxy having 1 to 6 C atoms,
$Y^1$ to $Y^6$ each, independently of one another are, H or F, provided that if $Y^{2-4}$ in formula II each denote F, $Y^5$ and $Y^6$ do not simultaneously denote H, and
r 0 or 1,
provided that the compound of formula II is different from the compound of formula I, II', IX or XI; and one or more compounds selected from the group consisting of compounds of the following formulae

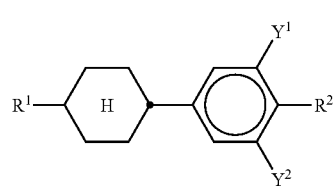
VII

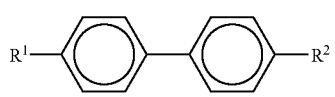
VIII in which the individual radicals have the following meanings:

R¹ and R² each, independently of one another, n-alkyl, alkoxy, oxaalkyl, fluoroalkyl or alkenyl, each having 1 to 9 C atoms, and Y¹ and Y² each, independently of one another, H or F.

9. A liquid-crystalline medium according to one of claim 7, which comprises one or more compounds of the following formula

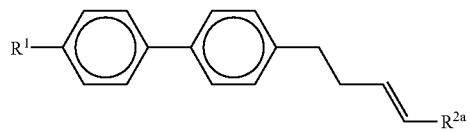

VIIIa in which R¹ denotes alkyl having 1 to 8 C atoms and $R^{2a}$ denotes H, $CH_3$ or $C_2H_5$.

10. A liquid-crystalline medium, which comprises:
one or more compounds of the formula I

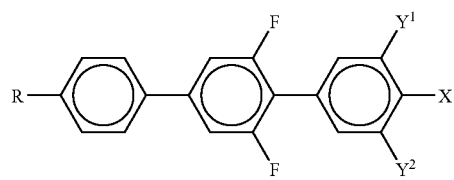

I in which
R is a halogenated or unsubstituted alkyl or alkoxy radical having 1 to 15 C atoms, where one or more $CH_2$ groups in these radicals, independently of one another are optionally replaced by —C≡C—, —$CF_2$O—, —CH=CH—,

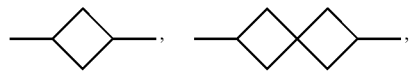

—O—, —CO—)— or —O—CO— in such a way that O atoms are not linked directly to one another, X denotes F, Cl, CN, $SF_5$, SCN, NCS, or a halogenated alkyl radical, a halogenated alkenyl radical, a halogenated alkoxy radical or a halogenated alkenyloxy radical having 1 to 6 C atoms, and Y¹ and Y² each, independently of one another, denote H or F; and one or more compounds of at least one of formulae II', IX, XI-XV, XXI and Q-3:

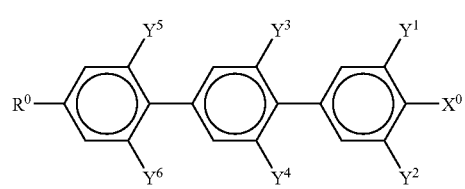

II'

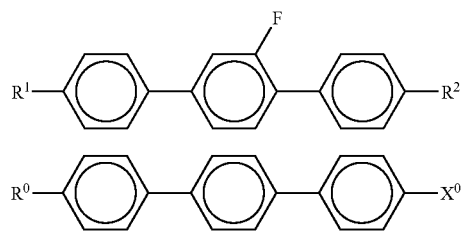

IX

XI

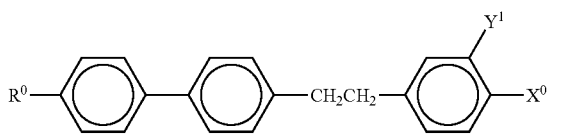

XII

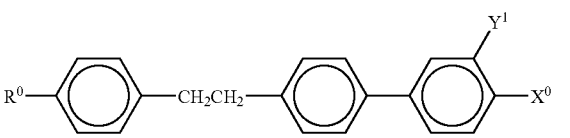

XIII

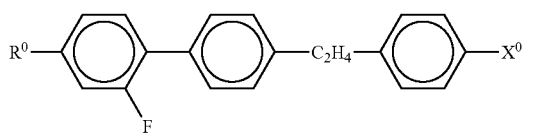

XIV

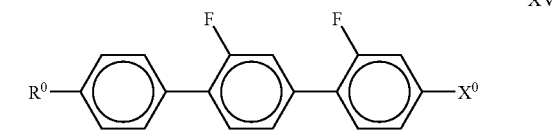

XV

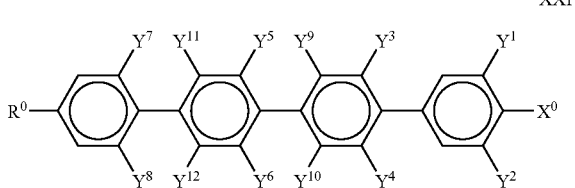

XXI

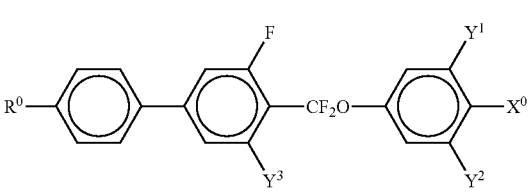

Q-3 wherein:
R⁰ is n-alkyl, alkoxy, oxaalkyl, fluoroalkyl or alkenyl, each having 1 to 9 C atoms, R¹ and R² each, independently of one another, are n-alkyl, alkoxy, oxaalkyl, fluoroalkyl or alkenyl, each having 1 to 9 C atoms, X⁰ is F, Cl, or halogenated alkyl, halogenated alkenyl, halogenated oxaalkyl, halogenated alkenyloxy or halogenated alkoxy having 1 to 6 C atoms, and Y¹ to Y¹² each, independently of one another are, H or F, provided that for formula II', Y⁴, Y⁵ and Y⁶ are each H; and one or more compounds of the following formula

X

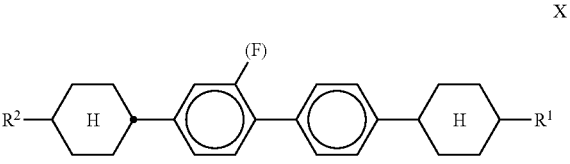

in which $R^1$ and $R^2$ each, independently of one another, n-alkyl, alkoxy, oxaalkyl, fluoroalkyl or alkenyl, each having 1 to 9 C atoms.

11. A liquid-crystalline medium, which comprises:
one or more compounds of the formula I

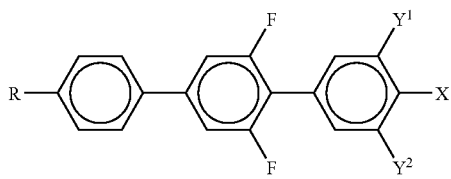

I in which
R is a halogenated or unsubstituted alkyl or alkoxy radical having 1 to 15 C atoms, where one or more $CH^2$ groups in these radicals, independently of one another, are optionally replaced by —C≡C—, —$CF^2$O—, —CH=CH—,

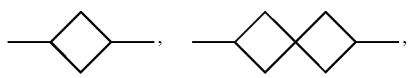

—O—, —CO—O— or —O—CO— in such a way that O atoms are not linked directly to one another,
X denotes F, Cl, CN, SF5, SCN, NCS, or a halogenated alkyl radical, a halogenated alkenyl radical, a halogenated alkoxy radical or a halogenated alkenyloxy radical having 1 to 6 C atoms, and
$Y^1$ and $Y^2$ each, independently of one another, denote H or F; and
one or more compounds of at least one of formulae II', IX, XI-XV, XXI and Q-3:

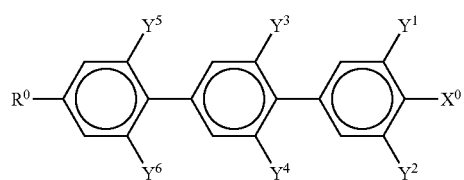

II'

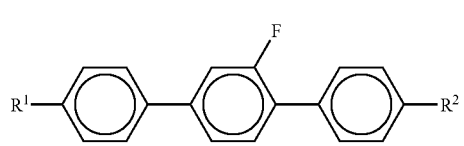

IX

XI

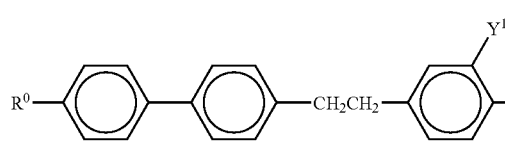

XII

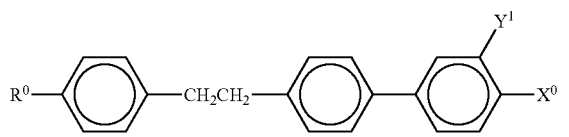

XIII

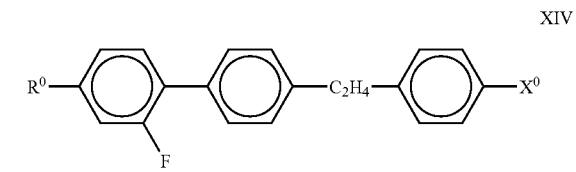

XIV

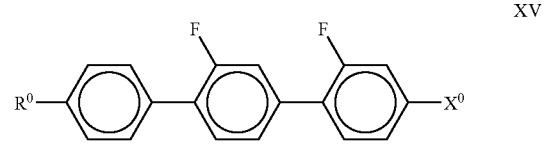

XV

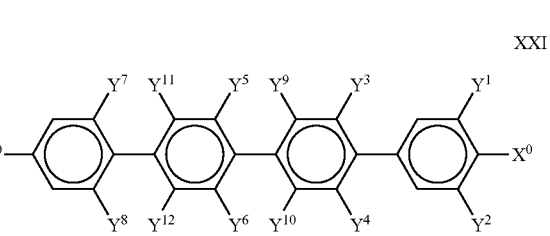

XXI

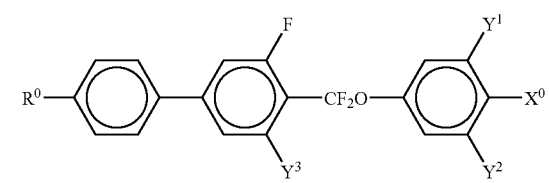

Q-3 wherein:
$R^0$ is n-alkyl, alkoxy, oxaalkyl, fluoroalkyl or alkenyl, each having 1 to 9 C atoms,
$R^1$ and $R^2$ each, independently of one another, are n-alkyl, alkoxy, oxaalkyl, fluoroalkyl or alkenyl, each having 1 to 9 C atoms,
is F, Cl, or halogenated alkyl, halogenated alkenyl, halogenated oxaalkyl, halogenated alkenyloxy or halogenated alkoxy having 1 to 6 C atoms, and
$Y^1$ to $Y^{12}$ each, independently of one another are, H or F, provided that for formula II', $Y^4$, $Y^5$ and $Y^6$ are each H; and
one or more compounds selected from the group consisting of the compounds of the following formulae:

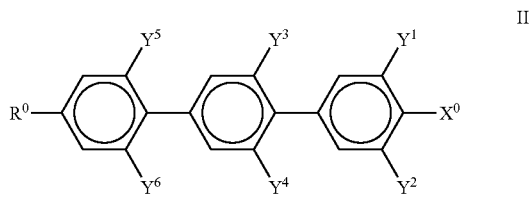

II

-continued

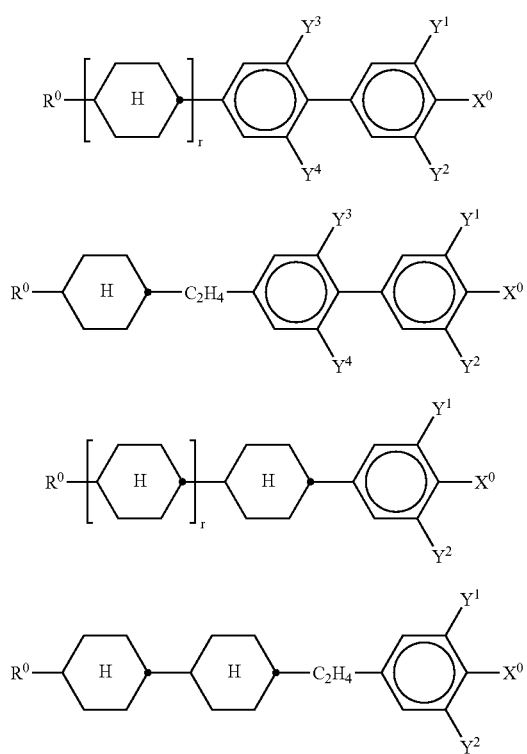

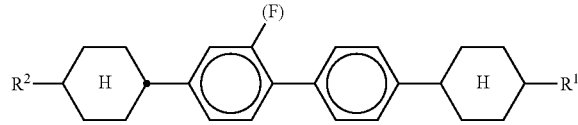

in which the individual radicals have the following meanings:
- $R^0$ is n-alkyl, alkoxy, oxaalkyl, fluoroalkyl or alkenyl, each having 1 to 9 C atoms,
- $X^0$ is F, Cl, or halogenated alkyl, halogenated alkenyl, halogenated oxaalkyl, halogenated alkenyloxy or halogenated alkoxy having 1 to 6 C atoms,
- $Y^1$ to $Y^6$ each, independently of one another are, H or F, provided that if $Y^{2-4}$ in formula II each denote F, $Y^5$ and $Y^6$ do not simultaneously denote H, and
- r 0 or 1, provided that the compound of formula II is different from the compound of formula I, II', IX or XI; and one or more compounds of the following formula

X

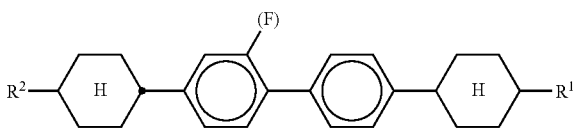

in which
- $R^1$ and $R^2$ each, independently of one another, n-alkyl, alkoxy, oxaalkyl, fluoroalkyl or alkenyl, each having 1 to 9 C atoms.

12. A liquid-crystalline medium according to claim 7, which additionally comprises one or more compounds of the following formula

X

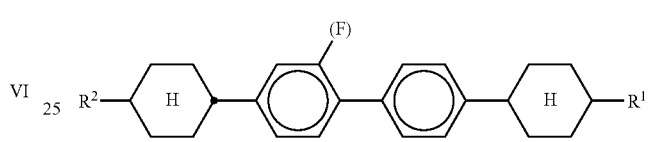

in which
- $R^1$ and $R^2$ each, independently of one another, n-alkyl, alkoxy, oxaalkyl, fluoroalkyl or alkenyl, each having 1 to 9 C atoms.

13. A liquid-crystalline medium according to claim 8, which additionally comprises one or more compounds of the following formula

X

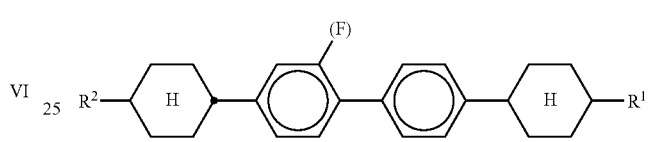

in which
- $R^1$ and $R^2$ each, independently of one another, n-alkyl, alkoxy, oxaalkyl, fluoroalkyl or alkenyl, each having 1 to 9 C atoms.

14. A liquid-crystalline medium according to claim 1 which comprises 2-40% by weight of compounds of the formula Ia and Ib.

15. A liquid-crystalline medium according to claim 13, which comprises
- 5-50% by weight of compounds of the formula II and/or
- 1-30% by weight of compounds of the formula III and/or
- 3-45% by weight of compounds of the formula VII and/or
- 3-25% by weight of compounds of the formula VIII and/or
- 10-50% by weight of compounds of the formula IX and/or
- 1-15% by weight of compounds of the formula X.

16. An electro-optical liquid-crystal display containing a liquid-crystalline medium according to claim 1.

17. An electro-optical liquid-crystal display according to claim 16, which is an LCOS display or a display for a projection system, monitor or notebook.

18. An electro-optical liquid-crystal display containing a liquid-crystalline medium according to claim 13.

19. An electro-optical liquid-crystal display containing a liquid-crystalline medium according to claim 15.

* * * * *

UNITED STATES PATENT AND TRADEMARK OFFICE
CERTIFICATE OF CORRECTION

PATENT NO. : 7,455,894 B2
APPLICATION NO. : 11/361056
DATED : November 25, 2008
INVENTOR(S) : Michael Wittek It is certified that error appears in the above-identified patent and that said Letters Patent is hereby corrected as shown below:

Column 46, line 7, claim 2 reads "formula II ends denotes" should read -- formula II each denotes --

Column 46, line 12, claim 2 reads "compound fo" should read -- compound of --

Column 50, line 6-7, claim 7 reads "formula I consisting of compounds of the following formulae" should read -- formula I --

Column 50, line 32, claim 7 reads "that 0" should read -- that O --

Column 50, line 34, claim 7 reads "SF5," should read -- $SF_5$, --

Column 52, line 2, claim 7 reads "fluoroalkyl pg, or" should read -- fluoroalkyl or --

Column 52, line 22, claim 8 reads "group s" should read -- groups --

Column 52, line 31, claim 8 reads "—)—," should read -- —O—, --

Column 52, line 31, claim 8 reads "in such a way that 0" should read -- in such a way that O --

Column 55, line 30, claim 8 reads "group s" should read -- groups --

Column 55, line 39, claim 8 reads "—CO—)—" should read -- —CO—O— --

UNITED STATES PATENT AND TRADEMARK OFFICE
CERTIFICATE OF CORRECTION

PATENT NO.        : 7,455,894 B2
APPLICATION NO.   : 11/361056
DATED             : November 25, 2008
INVENTOR(S)       : Michael Wittek It is certified that error appears in the above-identified patent and that said Letters Patent is hereby corrected as shown below:

Column 57, line 18, claim 11 reads "$CH^2$" should read -- $CH_2$ --

Column 57, line 20, claim 11 reads "—$CF^2O$—," should read -- —$CF_2O$—, --

Column 57, line 29, claim 11 reads "SF5" should read -- $SF_5$ --

Column 58, line 50, claim 11 reads "is F," should read -- $X^0$ is F, --

Column 59, line 43, claim 11 begin a new line after "XI; and"

Signed and Sealed this

Fourteenth Day of April, 2009

JOHN DOLL
*Acting Director of the United States Patent and Trademark Office*